(12) United States Patent
Lu et al.

(10) Patent No.: US 11,653,276 B2
(45) Date of Patent: *May 16, 2023

(54) APPARATUS AND METHOD IN WIRELESS COMMUNICATION SYSTEM AND COMPUTER READABLE STORAGE MEDIUM

(71) Applicant: Sony Group Corporation, Tokyo (JP)

(72) Inventors: Penshun Lu, Beijing (CN); Wenbo Zhang, Beijing (CN); Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 17/348,763

(22) Filed: Jun. 16, 2021

(65) Prior Publication Data

US 2021/0321311 A1 Oct. 14, 2021

Related U.S. Application Data

(63) Continuation of application No. 16/643,593, filed as application No. PCT/CN2018/105607 on Sep. 14, 2018, now Pat. No. 11,076,328.

(30) Foreign Application Priority Data

Sep. 21, 2017 (CN) .......................... 201710860562.7

(51) Int. Cl.
*H04W 36/00* (2009.01)
*H04W 24/10* (2009.01)
(Continued)

(52) U.S. Cl.
CPC ..... *H04W 36/00837* (2018.08); *H04W 24/10* (2013.01); *H04W 36/0061* (2013.01); *H04W 36/245* (2013.01); *H04W 36/32* (2013.01)

(58) Field of Classification Search
CPC ....... H04W 36/00837; H04W 36/0061; H04W 36/245; H04W 36/32
(Continued)

(56) References Cited

U.S. PATENT DOCUMENTS

2015/0036663 A1 2/2015 Kilpatrick et al.
2017/0118688 A1 4/2017 Guvenc

FOREIGN PATENT DOCUMENTS

CN 102412886 A 4/2012
CN 104053197 A 9/2014
(Continued)

OTHER PUBLICATIONS

International Search Report and Written Opinion dated Nov. 29, 2018 for PCT/CN2018/105607 filed on Sep. 14, 2018, 8 pages including English Translation of the International Search Report.
(Continued)

*Primary Examiner* — Joel Ajayi
(74) *Attorney, Agent, or Firm* — Xsensus LLP

(57) ABSTRACT

Disclosed are an apparatus and a method in a wireless communication system and a computer readable storage medium, the apparatus comprising a processing circuit, and the processing circuit being configured to: configure a measurement cell range of a user device to include adjacent cells of the current serving cell of the user device and cells other than the adjacent cells; and notify the user device of the measurement cell range, such that the user device implements measurement for the measurement cell range. According to at least one aspect of the embodiments of the present disclosure, expanding the measurement cell range for an unmanned aerial vehicle to include cells other than adjacent cells can prevent the occurrence of frequent handover.

6 Claims, 22 Drawing Sheets

(51) Int. Cl.
*H04W 36/24* (2009.01)
*H04W 36/32* (2009.01)

(58) Field of Classification Search
USPC .......................................................... 455/440
See application file for complete search history.

(56) References Cited

FOREIGN PATENT DOCUMENTS

| CN | 106647814 A | 5/2017 |
|---|---|---|
| CN | 106686647 A | 5/2017 |
| CN | 106774432 A | 5/2017 |
| EP | 1422959 A1 | 5/2004 |
| EP | 2629568 A1 | 8/2013 |
| WO | 02/37733 A1 | 5/2002 |
| WO | 2015/071267 A1 | 5/2015 |
| WO | 2019/011427 A1 | 1/2019 |

OTHER PUBLICATIONS

LG Electronics: "Potential enhancements for aerial vehicle's interference mitigation", 3GPP Draft; R1-1713112, Aug. 20, 2017 (Aug. 20, 2017), XP051315921, 3pp.

Huawei et al: "Analysis and Simulation of Handover Issues for Drones", 3GPP Draft; R2-1708544, Aug. 20, 2017 (Aug. 20, 2017), XP051318396, 9 pp.

Nokia et al: "Potential mobility issues for air-borne UEs", 3GPP Draft; R2-1704321, May 5, 2017 (May 5, 2017), XP051263775, 4 pp.

SONY: "Discussion on measurement for Aerial Vehicles handover", 3GPP Draft; R2-1711027, 3rd Generation Partnership Project (3GPP), France, vol. RAN WG2, No. Prague, Czech Republic; Oct. 9, 2017-Oct. 13, 2017, Sep. 28, 2017 (Sep. 28, 2017), XP051354425, Retrieved from the Internet: URL:http://www.3gpp.org/ftp/tsg ran/WG2RL2/TSGR2 99bis/Docs/- - [retrieved on Sep. 28, 2017] * paragraph [0002] *, 4 pp.

Extended European Search Report dated Oct. 27, 2020, in corresponding European Patent Application No. 18859854.4, 20 pp.

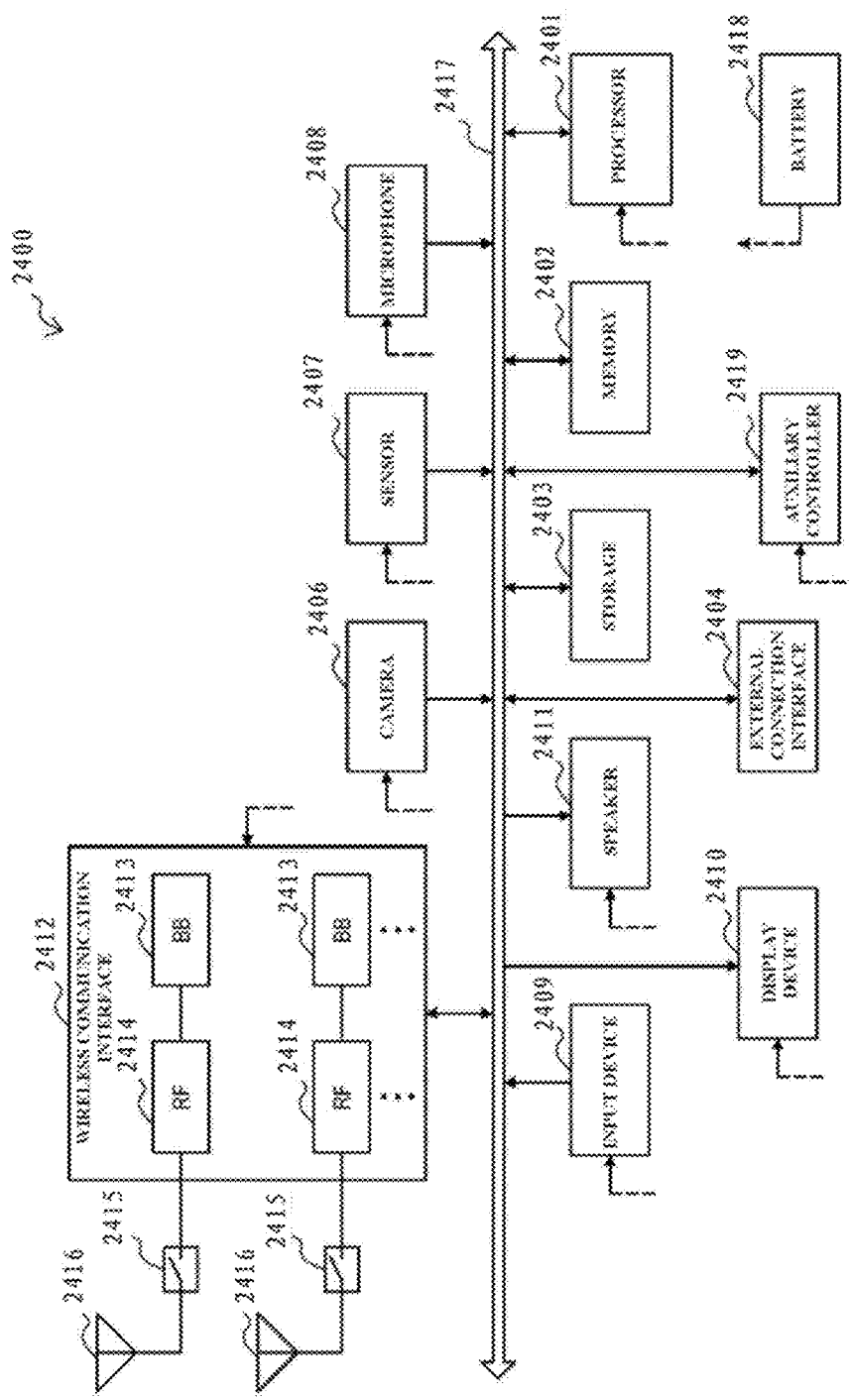

APPARATUS AND METHOD IN WIRELESS COMMUNICATION SYSTEM AND COMPUTER READABLE STORAGE MEDIUM

CROSS-REFERENCE TO RELATED APPLICATIONS

This application is a continuation of U.S. application Ser. No. 16/643,593, filed Mar. 2, 2020, which is based on PCT filing PCT/CN2018/105607, filed Sep. 14, 2018, which claims the priority to China Patent Application No. 201710860562.7, filed on Sep. 21, 2017 with the Chinese Patent Office, each of which is incorporated herein by reference in its entirety.

FIELD

The present disclosure relates to the technical field of wireless communications, and in particular to an unmanned aerial vehicle (UAV) communication technology based on Long Term Evolution (LTE).

BACKGROUND

Currently, there is increasing interest in the use of unmanned aerial vehicles (also known as unmanned aircrafts) in cellular networks. The commercial use scenarios of unmanned aerial vehicles are also growing rapidly, such as search and rescue, critical infrastructure monitoring, wildlife protection, flight cameras, surveillance. These application scenarios will increase rapidly in the next few years. The distribution of existing LTE networks can provide good services for the unmanned aerial vehicles. Therefore, if the unmanned aerial vehicle is connected to the current LTE network, it will definitely help to enhance the application of the unmanned aerial vehicle in these scenarios.

However, the unmanned aerial vehicle is different from a conventional user equipment (UE) on the ground, for example, a flight height and a flight speed of the unmanned aerial vehicle are much larger than those of the conventional UE on the ground. In a case that the flight height of the unmanned aerial vehicle is low (relative to a base station), the unmanned aerial vehicle may be regarded as a conventional UE. However, in a case that the flight height of the unmanned aerial vehicle is high (e.g., higher than the base station), the uplink signal from the unmanned aerial vehicle will be received by more cells due to the Line-of-Sight (LoS). In this case, the uplink signal from the unmanned aerial vehicle is an interference signal with respect to other cells than a serving cell of the unmanned aerial vehicle, which affects normal communication of devices such as UEs and Internet of Things (IoT) in these cells. Therefore, there is an urgent need to enhance the unmanned aerial vehicle communication based on the LTE.

SUMMARY

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

In view of this, an object of at least one aspect of the present disclosure is to provide a new and improved apparatus and method in a wireless communication system and a computer readable storage medium, by which a series of problems (such as frequent handover, delayed handover, ping-pong handover) caused in a case that measurement and report configuration of a conventional UE on the ground is applied to an unmanned aerial vehicle can be solved, thereby improving performance of performed actions (including handover, connection reestablishment, load balancing, and the like) of the unmanned aerial vehicle related to a measurement result.

According to an aspect of the present disclosure, an apparatus in a wireless communication system is provided. The apparatus includes processing circuitry configured to: configure a range of measured cells for a user equipment to include adjacent cells of a current serving cell of the user equipment and other cells than the adjacent cells; and notify the range of measured cells to the user equipment in order for the user equipment to perform a measurement based on the range of measured cells.

According to another aspect of the present disclosure, an apparatus in a wireless communication system is further provided. The apparatus includes processing circuitry configured to: perform a measurement according to a range of measured cells notified by a base station; and report a measurement result to the base station in order for the base station to perform a relevant decision, where the range of measured cells includes adjacent cells of a current serving cell of a user equipment and other cells than the adjacent cells.

According to another aspect of the present disclosure, a method in a wireless communication system is further provided. The method includes: configuring a range of measured cells for a user equipment to include adjacent cells of a current serving cell of the user equipment and other cells than the adjacent cells; and notifying the range of measured cells to the user equipment in order for the user equipment to perform a measurement based on the range of measured cells.

According to another aspect of the present disclosure, a method in a wireless communication system is further provided. The method includes: performing a measurement according to a range of measured cells notified by a base station; and reporting a measurement result to the base station in order for the base station to perform a relevant decision, where the range of measured cells includes adjacent cells of a current serving cell of a user equipment and other cells than the adjacent cells.

According to another aspect of the present disclosure, a computer readable storage medium storing a program is further provided. The program, when executed by a computer, causes the computer to perform the method in a wireless communication system according to the embodiments of the present disclosure.

According to other aspects of the present disclosure, there are further provided a computer program code and a computer program product for implementing the method in a wireless communication system according to the embodiments of the present disclosure.

According to at least one aspect of embodiments of the present disclosure, by configuring the range of measured cells for the unmanned aerial vehicle to include not only adjacent cells of a current serving cell of the unmanned aerial vehicle but also other cells (for example, adjacent cells of the adjacent cells) than the adjacent cells, the problem of frequent handover of the unmanned aerial vehicle under the conventional measurement configuration (the range of measured cells includes only the adjacent cells) can be effectively solved.

Other aspects of the embodiments of the present disclosure are set forth in the following specification, in which preferred embodiments for fully disclosing the embodiments of the present disclosure are described in detail without being limited thereto.

BRIEF DESCRIPTION OF THE DRAWINGS

The present disclosure can be understood better with reference to the description given in conjunction with the drawings in the following. The same or similar element is indicated by the same or similar reference numeral throughput all the drawings. The drawings are included in the description together with the following detailed illustration and form a part of the description, and are used to further illustrate preferred embodiments of the present disclosure and explain principles and advantages of the present disclosure by examples. In the drawings:

FIG. 25 is a block diagram showing a schematic configuration example of a smartphone to which the technology of the present disclosure may be applied.

DETAILED DESCRIPTION OF EMBODIMENTS

Figure 1:
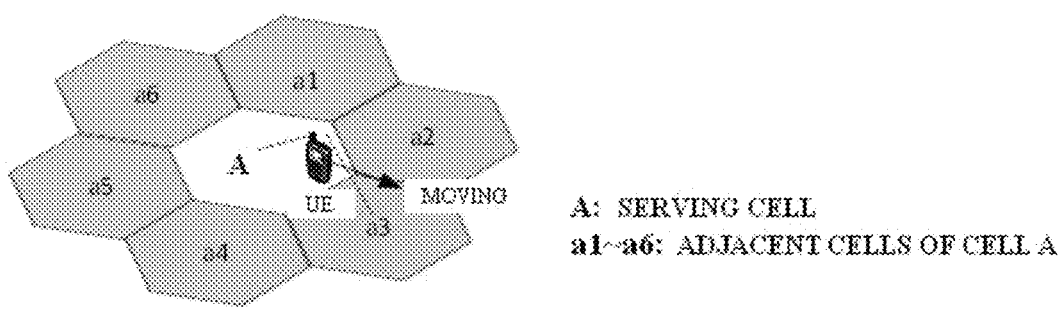
FIG. 1 is a schematic diagram showing a scenario example of a handover procedure of a conventional UE in LTE in the conventional technology.

Hereinafter, exemplary embodiments of the present disclosure are described in conjunction with the drawings. For the sake of clarity and conciseness, all features of a practical implementation are not described in the description. However, it should be appreciated that a number of implementation-specific decisions have to be made during the development of any such practical embodiment in order to achieve specific objects of the developer, for example, to meet those restrictions associated with systems and services. These restrictions may vary depending on the implementation. In addition, it should also be appreciated that the development work is only a routine task for those skilled in the art benefiting from the present disclosure while the development work may be complex and time consuming.

It should further be noted that, in order to avoid obscuring the present disclosure due to unnecessary details, device structures and/or processing steps closely related to solutions according to the present disclosure are merely shown in the drawings, and other details that are less related to the present disclosure are omitted.

Hereinafter, preferred embodiments of the present disclosure are described in detail with reference to FIGS. 1 to 25. The description is made hereinafter in the following order.

1. First Embodiment (Configuration of Range of Measured Cells)
   1-1. Configuration Example of Apparatus at Base Station Side
   1-2. Configuration Example of Apparatus at User Equipment Side
   1-3. Method Embodiment
2. Second Embodiment (Other Parameter Configuration in Measurement and Report Configuration)
   2-1. Configuration Example of Apparatus at Base Station Side
   2-2. Configuration Example of Apparatus at User Equipment Side
   2-3. Method Embodiment
3. Computing Device for Implementing Embodiments of Apparatus and Method of Present Disclosure
4. Application Examples of Technology of Present Disclosure
   4-1. Application Example at Base Station Side
   4-2. Application Example at User Equipment Side Before the embodiments of the present disclosure are described in detail, it should be noted that the "unmanned aerial vehicle" or "unmanned aircraft" as used herein includes not only the unmanned aerial vehicle itself in the general sense but also a conventional user equipment (such as a smart phone and a personal digital assistant (PDA)) that is carried by the unmanned aerial vehicle. That is, the unmanned aerial vehicle refers to any user equipment that can move at a certain height. Therefore, a "user equipment" mentioned hereafter may be understood as generally indicating a "unmanned aerial vehicle" or a terminal having an unmanned aerial vehicle communication capability unless it is explicitly indicated that the user equipment is a conventional user equipment rather than an unmanned aerial vehicle and does not have the unmanned aerial vehicle communication capability. The "unmanned aerial vehicle communication capability" herein refers to an ability of a user equipment to access an LTE network for communication while flying in the air.

In addition, it should further be noted that in the following description for the embodiments, an effect of configuration of a range of measured cells and configuration of related parameters in measurement and report configuration on a measurement related action of an unmanned aerial vehicle is described by taking a handover procedure as an example. However, it should be understood that, the present disclosure is not limited thereto. The configuration of the range of measured cells and the configuration of the related parameters in the measurement and report configuration according to the technology of the present disclosure may be applied to any measurement related action, and those skilled in the art may suitably configure the range of measured cells and the related parameters in the measure and reporting configuration for a specific measurement related action in accordance with the principle of the present disclosure.

1. First Embodiment (Configuration of Range of Measured Cells)

FIG. 1 is a schematic diagram showing a scenario example of a handover procedure of a conventional UE in LTE in the conventional technology.

As shown in FIG. 1, a cell A is a serving cell (also referred to as a source cell) of a user equipment UE, cells a1 to a6 are adjacent cells of the cell A, and the user equipment UE is moving to the adjacent cell a3. As the user equipment UE moves away from the cell A, the signal quality or signal strength of the user equipment UE receiving the cell A is getting lower and lower. In this case, the cell A instructs the user equipment UE to measure the signal quality or signal strength of the adjacent cells a1 to a6 by transmitting an RRC message (for example, an RRC connection reconfiguration message RRCConnectionReconfiguration) to the user equipment UE. As an example, the user equipment UE may perform a signal quality measurement by measuring a power on a cell-specific reference signal (CRS), and calculate a reference signal reception power (RSRP) and/or a reference signal reception quality (RSRQ), and include calculated RSRPs and/or RSRQs of measured cells in the RRC message (specifically, a measurement report MeasurementReport) to be reported to the base station periodically or based on event triggering. The cell A may determine whether a handover condition is satisfied based on the received measurement report, and make a handover decision if it is determined that the handover condition is satisfied, thereby instructing the user equipment UE to perform a handover to a target cell.

Since the unmanned aerial vehicle can fly in the air (the flight height is much higher than a conventional UE on the ground) and the flight speed can reach 100 km/h, and a coverage radius of a general macro cell is about 1 km to 30 km, handover of the unmanned aerial vehicle in accordance with the above-mentioned traditional handover procedure of the UE may cause the problem that the unmanned aerial vehicle frequently performs the handover, making the traditional handover procedure very inefficient.

[1-1. Configuration Example of Apparatus at Base Station Side]

In order to solve at least the above problem that the unmanned aerial vehicle frequently performs the handover due to the conventional configuration of the range of measured cells, a solution of configuring the range of measured cells by considering height information of the unmanned aerial vehicle is provided in the present disclosure.

Figure 2:
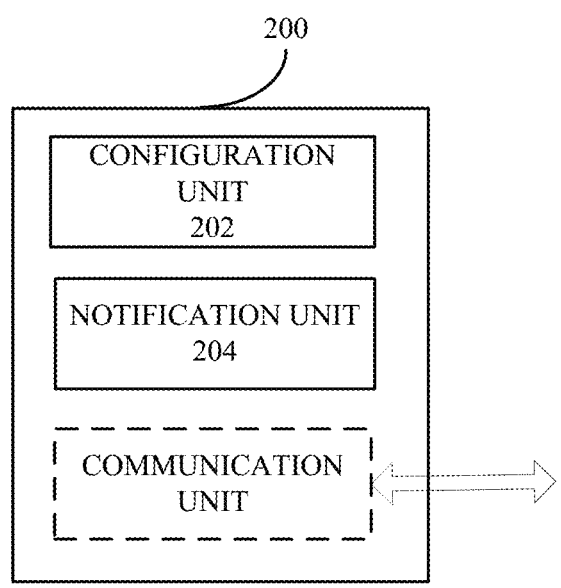
FIG. 2 is a block diagram showing a functional configuration example of an apparatus at a base station side in a wireless communication system according to a first embodiment of the present disclosure.

FIG. 2 is a block diagram showing a functional configuration example of an apparatus at a base station side in a wireless communication system according to a first embodiment of the present disclosure.

As shown in FIG. 2, an apparatus 200 according to this embodiment may include a configuration unit 202 and a notification unit 204.

The configuration unit 202 is configured to configure a range of measured cells for a user equipment to include adjacent cells of a current serving cell of the user equipment and other cells than the adjacent cells.

In a case that the flight height of the unmanned aerial vehicle is high, a channel condition is high due to the LoS between the unmanned aerial vehicle and a serving base station, and thus a path loss is small. Therefore, it is assumed that the unmanned aerial vehicle performs, for example, the handover, under the same path loss condition as the conventional UE on the ground, a relative distance between the unmanned aerial vehicle and the base station when the handover occurs is much larger than a relative distance between the conventional UE and the base station on the ground. In general, the conventional UE on the ground generally performs the handover around an edge of a cell (that is, the distance at which the handover occurs is approximately a radius of the cell), while the unmanned aerial vehicle may perform the handover only after the unmanned aerial vehicle flies through multiple cells. Thus, in order to avoid the frequent handover that is virtually unnecessary, the range of measured cells for the unmanned aerial vehicle may be expanded to include other cells than the adjacent cells.

Specifically, taking an urban macro BS (UMa) scenario as an example, it is assumed that a path loss model defined for the unmanned aerial vehicle in this scenario may be expressed as:

$$PL_{UMa\text{-}UAV\text{-}LOS} = 28.0 + 22\log_{10}(d_{3D}) + 20\log_{10}(f_c)$$

where $PL_{Uma\text{-}UAV\text{-}LOS}$ represents a path loss, $d_{3D}$ represents a three-dimensional spatial distance between the unmanned aerial vehicle and the base station, and fc represents a carrier frequency. It is assumed that the unmanned aerial vehicle performs the handover when the path loss reaches 107 dB (which is a path loss value when the conventional UE on the ground in the Uma scenario performs the handover), the three-dimensional space distance at this time may be calculated, i.e., $d_{3D}=10^{((107-28-20\log10(2))/22)}=2018.2$ m.

It is assumed that the flight height of the unmanned aerial vehicle at this time is 300 m and the height of the base station is 25 m, a two-dimensional horizontal distance between the unmanned aerial vehicle and the base station may be calculated according to a trigonometric formula, i.e., $d_{2D}=\text{sqr}((2018.2)^2-(300-25)^2)=2000$ m.

It can be seen that the distance $d_{2D}$ is much larger than a diameter of a cell in this scenario, i.e., the distance $d_{2D}$ is much larger than $2R=500*\frac{2}{3}=333.3333$ m. That is, in a case that the unmanned aerial vehicle is above a certain height, the measurement range of the unmanned aerial vehicle is much larger than that of the conventional UE on the ground under the same handover path loss. In this example, the flight height of the unmanned aerial vehicle is 300 m, and the measurement range in the UMa scenario is approximately 2000/333.3333=6 cells.

An example of the configuration of the range of measured cells for the unmanned aerial vehicle is described with reference to FIG. 3, which is a schematic diagram showing a configuration example of a range of measured cells according to the first embodiment of the present disclosure.

Figure 3:
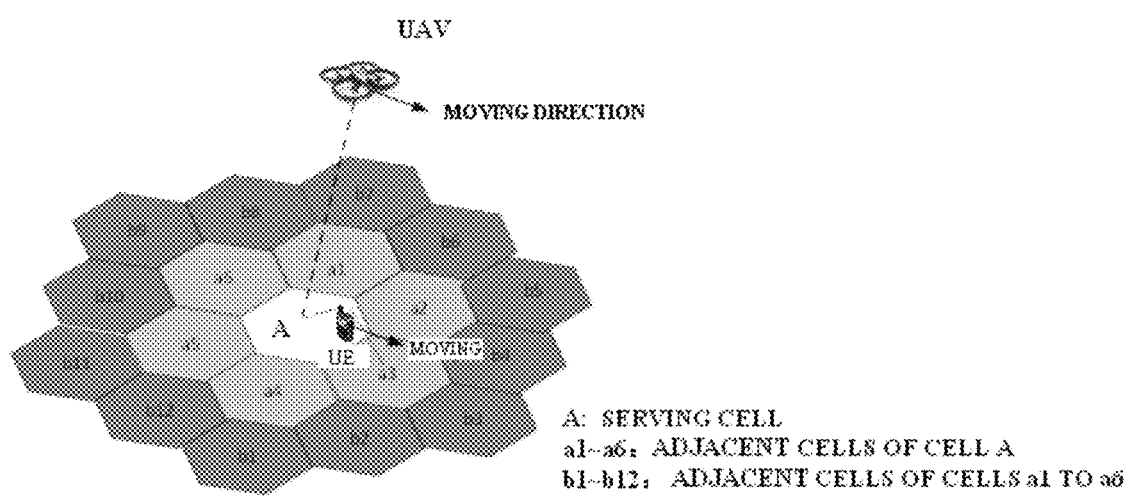
FIG. 3 is a schematic diagram showing a configuration example of a range of measured cells according to the first embodiment of the present disclosure.

As shown in FIG. 3, a cell A is a current serving cell (source cell) of an unmanned aerial vehicle UAV, and the unmanned aerial vehicle UAV is moving away from the cell A. Since the flight height of the unmanned aerial vehicle UAV at this time is high (for example, higher than the base station), the unmanned aerial vehicle UAV is in the LoS condition with more cells, so that the unmanned aerial vehicle can receive downlink reference signals (e.g., CRS) from the more cells (including adjacent cells a1 to a6 of the cell A and adjacent cells b1 to b12 of the adjacent cells a1 to a6), while the conventional UE on the ground cannot receive the downlink reference signals from the cells b1 to b12. Therefore, the range of measured cells for the unmanned aerial vehicle UAV includes not only adjacent cells (for example, the adjacent cells a1 to a6 shown in FIG. 3) of the current serving cell, but also other cells (for example, the adjacent cells b1 to b12 of the adjacent cells a1 to a6 shown in FIG. 3) than the adjacent cells, rather than that the range of measured cells for the conventional UE on the ground is configured to include only the adjacent cells a1 to a6 of the cell A.

It can be understood that in a case that the unmanned aerial vehicle has just flown away or has a low flight height (relative to the height of the base station), the unmanned aerial vehicle is not much different from the conventional user equipment on the ground. In this case, the unmanned aerial vehicle operates in an operation mode similar to the operation mode of the conventional user equipment. The operation mode in the case that the unmanned aerial vehicle flies at a height lower than a certain height threshold is referred to as a "hovering mode". In addition, in a case that the flight height of the unmanned aerial vehicle is high, the so-called hovering mode cannot satisfy communication requirements of the unmanned aerial vehicle. In this case, the unmanned aerial vehicle preferably operates in another operation mode different from the above-described hovering mode. The operation mode in the case that the unmanned aerial vehicle flies at a height above the certain height threshold is referred to as a "flying mode". Preferably, the configuration unit 202 may be further configured to determine the range of measured cells to include only the adjacent cells of the current serving cell if it is determined according to height information of the user equipment that a current height of the user equipment is lower than a predetermined height threshold. The predetermined height threshold may be, for example, a height threshold that is predetermined and is used for determining whether the unmanned aerial vehicle is in the flying mode. In other words, different ranges of measured cells may be configured for different operation modes of the unmanned aerial vehicle.

As an implementation example, the configuration unit 202 may be further configured to determine the range of measured cells according to a height interval in which the current height of the user equipment is located and a predetermined correspondence relationship between height intervals and ranges of measured cells. This implementation example is described below with reference to FIG. 4.

Figure 4:
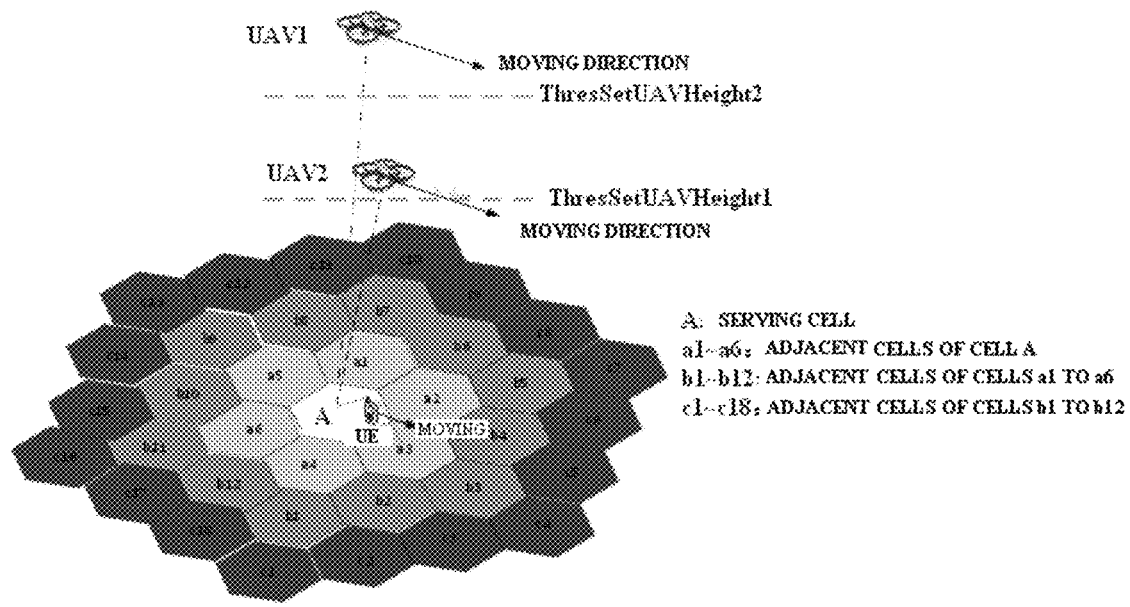
FIG. 4 is a schematic diagram showing another configuration example of the range of measured cells according to the first embodiment of the present disclosure.

FIG. 4 is a schematic diagram showing another configuration example of the range of measured cells according to the first embodiment of the present disclosure.

As shown in FIG. 4, a cell A is a current serving cell (source cell) of a conventional user equipment UE, an unmanned aerial vehicle 1 (UAV1), and an unmanned aerial vehicle 2 (UAV2), cells a1 to a6 represent adjacent cells of the cell A, cells b1 to b12 represent adjacent cells of the cells a1 to a6, cells c1 to c18 represent adjacent cells of the cells b1 to b12, and the conventional user equipment UE, the unmanned aerial vehicle 1 and the unmanned aerial vehicle 2 are all moving in a moving direction shown in FIG. 4.

In this case, for example, according to the predetermined correspondence relationship between the height intervals and the range of measured cells, the range of measured cells for the unmanned aerial vehicle 1 at a height between a first height threshold ThresSetUAVHeight1 and a second height threshold ThresSetUAVHeight2 is determined to include the cells a1 to a6 and the cells b1 to b12, and the range of measured cells for the unmanned aerial vehicle 2 at a height higher than the second height threshold ThresSetU-AVHeight2 is determined to include the cells a1 to a6, the cells b1 to b12, and the cells c1 to c18. The height intervals herein may be obtained by performing a division according to predetermined one or more height thresholds, and it is assumed that the first height threshold ThresSetUAVHeight1 is the minimum height threshold among the one or more height thresholds, that is, the height threshold used for determining whether the unmanned aerial vehicle is in the flying mode mentioned above. It can be understood that, although not shown in FIG. 4, the range of measured cells for an unmanned aerial vehicle whose flight height is lower than the first height threshold ThresSetUAVHeight1 may be determined to be the same as the range of measured cells for the conventional user equipment UE, that is, include only the adjacent cells a1 to a6 of the cell A.

It should be noted that the correspondence relationship between the ranges of measured cells and the height intervals described with reference to FIG. 4 is merely exemplary but not limitative, and those skilled in the art may appropriately set the correspondence relationship according to the principle of the present disclosure and specific application scenarios, to configure reasonable ranges of measured cells for the unmanned aerial vehicles in the height intervals.

Referring back to FIG. 2, preferably, the configuration unit 202 may be further configured to determine the range of measured cells according to a flight speed of the user equipment.

As the flight speed of the user equipment increases, the user equipment flies through more cells per unit time, and thus the range of measured cells should be configured to be larger. Therefore, preferably, the configuration unit 202 may configure the range of measured cells to increase as the flight speed of the user equipment increases.

As an implementation example, the configuration unit 202 may be further configured to determine the range of measured cells according to a speed interval in which the flight speed is located and a predetermined correspondence relationship between speed intervals and ranges of measured cells. Taking the scenario shown in FIG. 4 as an example, the following Table 1 is given, which shows an example of the correspondence relationship between the speed intervals and the ranges of measured cells.

TABLE 1

Example of Correspondence between Speed Intervals and Ranges of Measured Cells

| | Speed Interval | | |
|---|---|---|---|
| | 0~V1 | V1~V2 | ≥V2 |
| Ranges of measured Cells | {a1, . . . , a6} | {a1, . . . , a6; b1, . . . , b12} | {a1, . . . , a6; b1, . . . , b12; c1, . . . , c18} |

It should be understood that the correspondence relationship between the speed intervals and the ranges of measured cells shown in Table 1 above is merely exemplary but not limitative, and those skilled in the art may appropriately set the correspondence relationship between the speed intervals and the ranges of measured cells according to the principle of the present disclosure, actual application scenarios and the height information.

In addition, as mentioned above, for the unmanned aerial vehicle in the flying mode, as the flight height increases, the flight speed is faster, and the range of measured cells is larger, which increases a measurement load of the unmanned aerial vehicle to some extent. Therefore, in order to reduce the measurement load of the unmanned aerial vehicle while reducing the frequent handover, other factors may be considered to narrow the determined range of measured cells.

As a preferred example, the configuration unit 202 may be further configured to determine the range of measured cells according to a flight direction of the user equipment. An example in this case is described below with reference to FIG. 5.

Figure 5:
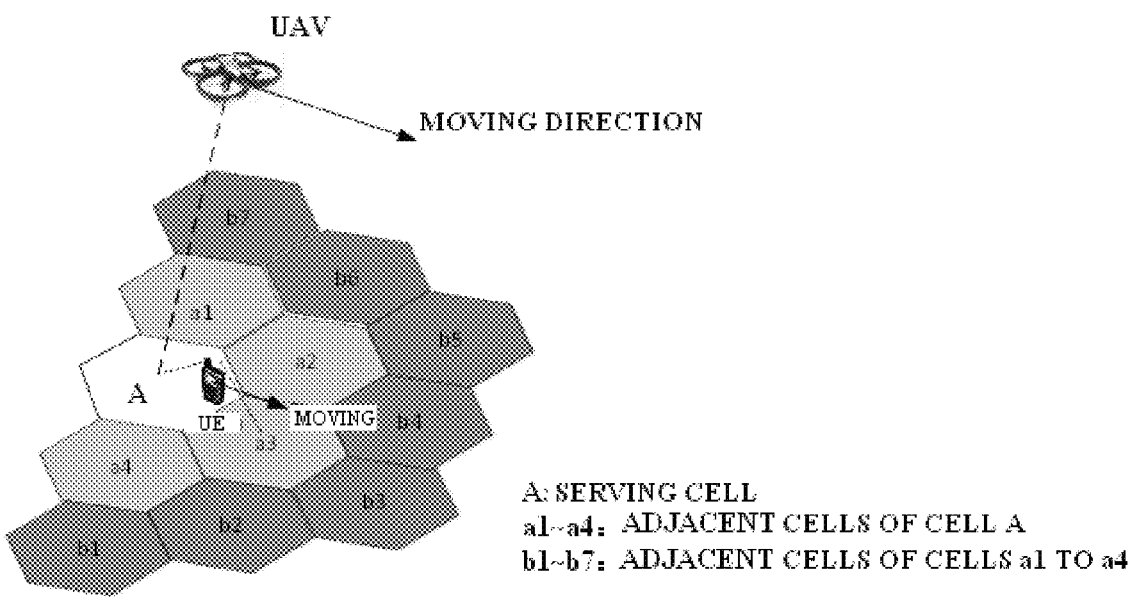
FIG. 5 is a schematic diagram showing another configuration example of the range of measured cells according to the first embodiment of the present disclosure.

FIG. 5 is a schematic diagram showing another configuration example of the range of measured cells according to the first embodiment of the present disclosure.

As shown in FIG. 5, it is assumed that an unmanned aerial vehicle UAV is flying in a moving direction (a due east direction) shown in FIG. 5. Since the unmanned aerial vehicle does not fly through cells west of a current serving cell A of the unmanned aerial vehicle during flight, in this case, a range of measured cells for the unmanned aerial vehicle UAV may be preferably determined to not include the cells west of the cell A, that is, the range of measured cells includes only cells a1 to a4 and cells b1 to b7. In this way, the range of measured cells is reduced, thereby reducing the measurement load of the user equipment. Further, since the number of reported measurement results is accordingly reduced, the load of the base station to perform a relevant decision can be reduced.

That is, preferably, the configuration unit 202 may be further configured to determine the range of measured cells to include a cell within a predetermined angle range with respect to the flight direction.

More specifically, examples of determining the range of measured cells according to the flight direction of the user equipment are described below with reference to FIGS. 6A and 6B, which are schematic diagrams respectively showing configuration examples of the range of measured cells with respect to a flight direction in the case of different cell arrangements.

Figure 6A:
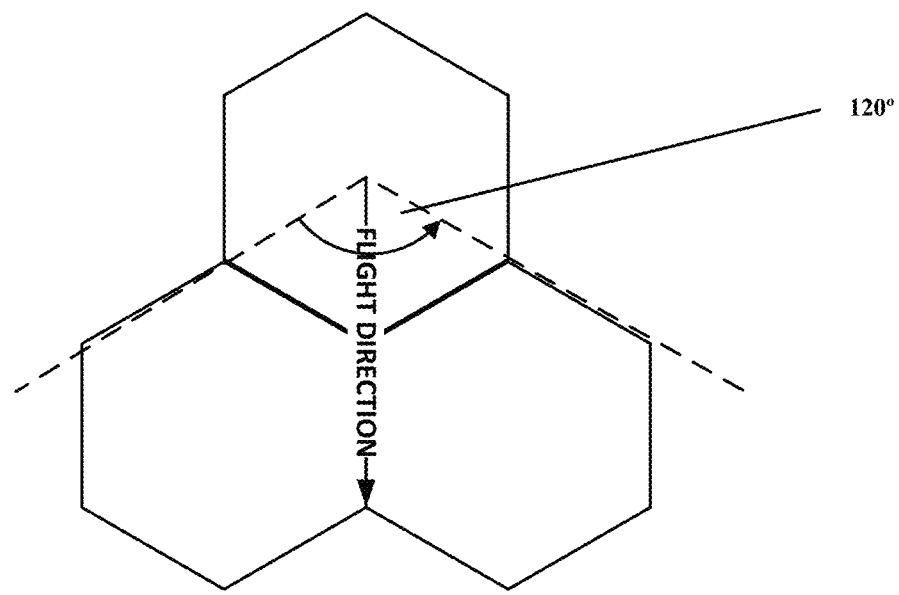
FIGS. 6A and 6B are schematic diagrams respectively showing configuration examples of the range of measured cells with respect to a flight direction in the case of different cell arrangements.
Figure 6B:
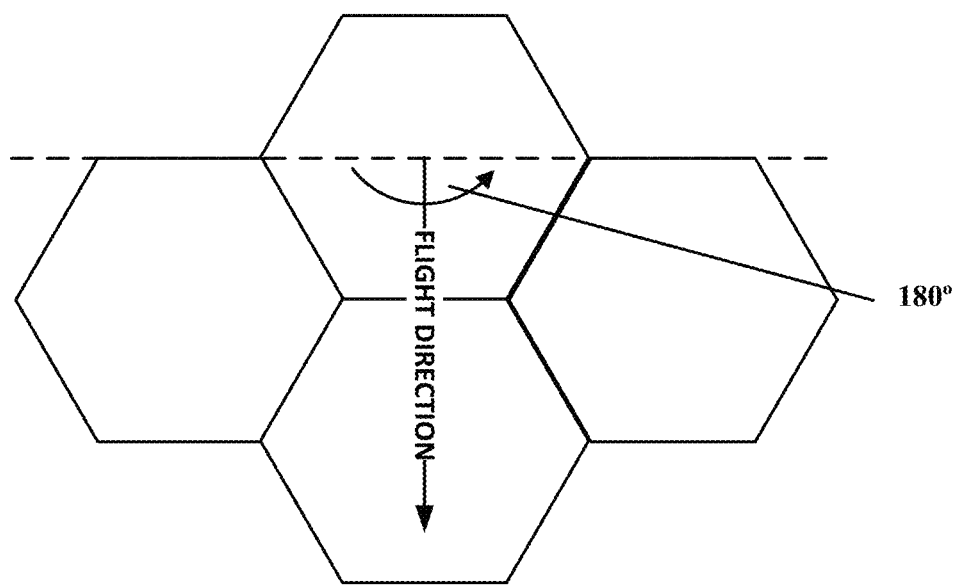

FIGS. 6A and 6B respectively show examples of two typical cell arrangements. As shown in FIG. 6A, in the case of the cell arrangement shown in FIG. 6A, the range of measured cells may be determined as cells in a range of 120 degrees centered on the flight direction. In addition, as shown in FIG. 6B, in the case of the cell arrangement shown in FIG. 6B, the range of measured cells may be determined as cells in a range of 180 degrees centered on the flight direction. Therefore, preferably, the range of measured cells may be determined as cells included in a range of 120 degrees to 180 degrees with respect to the flight direction.

It should be understood that determining the range of measured cells according to the flight direction described with reference to FIG. 6A and FIG. 6B is merely exemplary but not limitative, and those skilled in the art may appropriately set the angle range according to the principle of the present disclosure and actual application scenarios.

As a preferred example, the configuration unit 202 may be further configured to determine the range of measured cells according to a flight trajectory of the user equipment.

As an example, the configuration unit 202 may be configured to obtain the flight trajectory of the user equipment by performing a prediction according to one or more of a mobility history report about the user equipment, geographical location information reported by the user equipment and environmental information.

In some application examples, the flight trajectory of the unmanned aerial vehicle may be relatively fixed, so that the flight trajectory of the user equipment may be predicted according to historical information (e.g., the mobility history report about the user equipment, which includes a list of cells that the user equipment recently visits and a time period for which the user equipment stays at each cell. In addition, the base station may predict a future flight trajectory of the user equipment according to the geographical location information continuously reported by the user equipment. Alternatively, the flight trajectory of the user equipment may also be predicted according to the environment information. For example, according to the environment information such as actual terrain factors, the unmanned aerial vehicle may intentionally avoid certain areas, so that the flight trajectory of the unmanned aerial vehicle may be predicted accordingly. In the process that the flight trajectory of the user equipment is actually obtained, the prediction may be performed in combination with one or more of the above three factors and other factors to obtain a more accurate flight trajectory.

As an example, the configuration unit 202 may determine the range of measured cells to include cells along the flight trajectory such that the range of measured cells may be reduced.

In addition, as mentioned above, for some unmanned aerial vehicles in some applications, the flight trajectory may be relatively fixed and repetitive. If the predicted flight trajectory is highly consistent with the historical flight trajectory, a future target cell handover sequence should also be the same as a historical target cell handover sequence since the arrangement of the cell base station is also relatively fixed. Therefore, in order to further reduce the measurement and processing load, the user equipment may be configured to perform different handover procedures according to the consistency between the predicted flight trajectory and the historical flight trajectory.

Specifically, the configuration unit 202 may be further configured to: if a deviation between the flight trajectory of the user equipment and the historical flight trajectory is larger than a predetermined threshold, i.e., the deviation affects the selection of the target cell, configure the user equipment to perform a traditional handover procedure according to the determined range of measured cells. The traditional handover procedure is briefly described below with reference to FIGS. 7A and 7B.

Figure 7A:
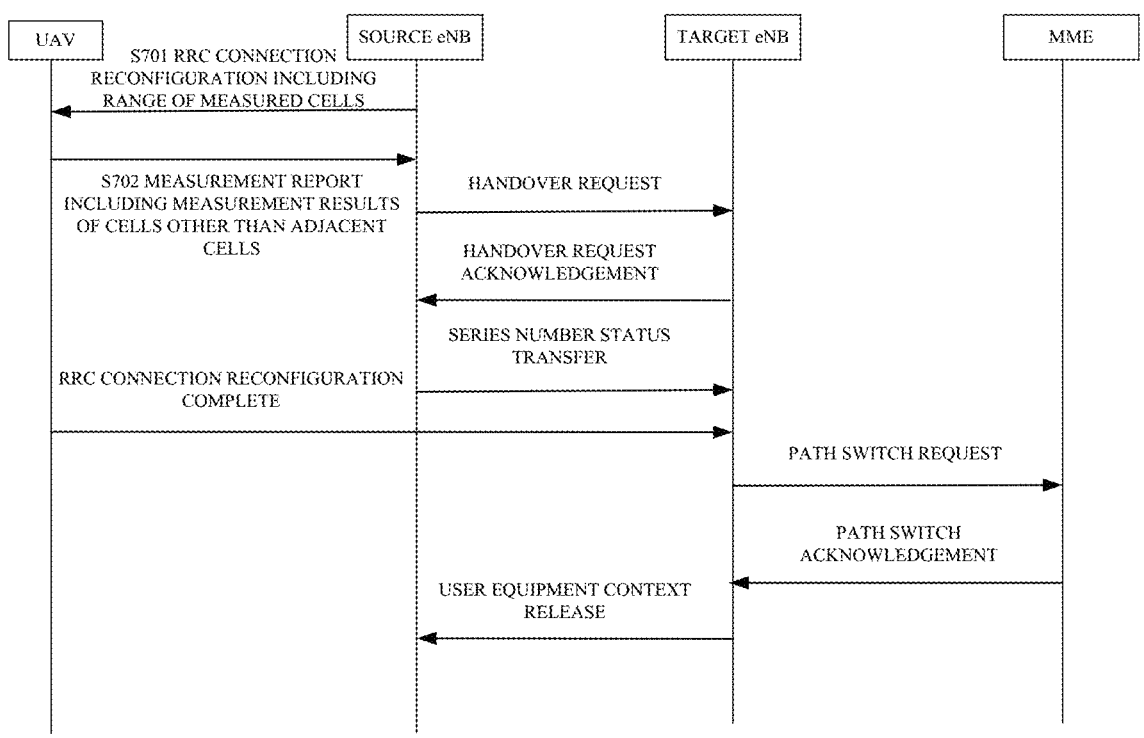
FIG. 7A is a flowchart showing an example of a handover procedure based on an X2 interface according to the first embodiment of the present disclosure.

FIG. 7A is a flowchart showing an example of a handover procedure based on an X2 interface according to the first embodiment of the present disclosure.

The handover procedure shown in FIG. 7A is substantially the same as the handover procedure based on the X2 interface in the conventional LTE network, except that in step S701, a source eNB includes the determined range of measured cells (not limited to adjacent cells) in the RRC message (for example, RRCConnectionReconfiguration) to notify the unmanned aerial vehicle UAV, where the range of measured cells includes not only the adjacent cells of the source cell but also other cells (for example, adjacent cells of the adjacent cells) than the adjacent cells. Then, the unmanned aerial vehicle UAV performs a measurement according to the notified range of measured cells, and in step S702, the unmanned aerial vehicle UAV includes measurement results about cells (not limited to the adjacent cells) satisfying a report condition in the range of measured cells in the measurement report (MeasurementReport) to be reported to the source eNB in order for the source eNB to perform a handover decision, including whether to perform a handover and selection of a handover target cell. The operations in the subsequent steps are substantially the same as those in the conventional technology, which are not described in detail herein.

Figure 7B:
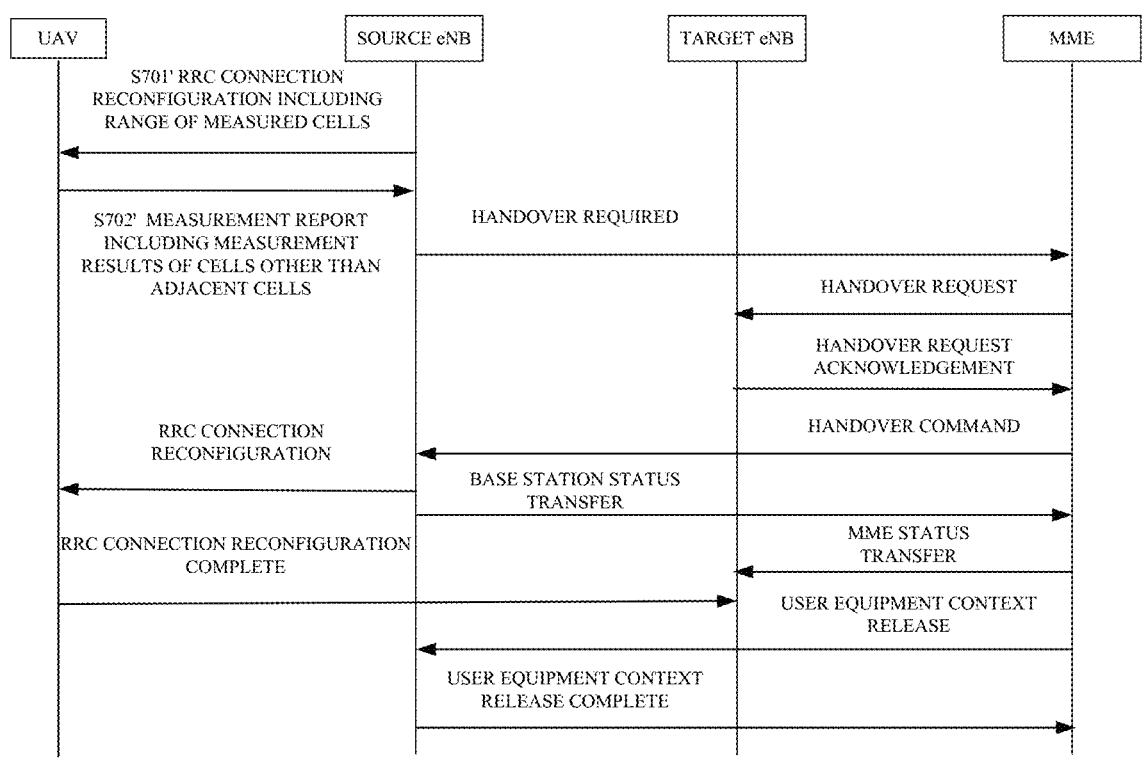
FIG. 7B is a flowchart showing an example of a handover procedure based on an S1 interface according to the first embodiment of the present disclosure.

FIG. 7B is a flowchart showing an example of a handover procedure based on an S1 interface according to the first embodiment of the present disclosure. The handover procedure shown in FIG. 7B is substantially the same as the handover procedure based on the S1 interface in the conventional LTE network, except that a range of measured cells included in an RRC message (e.g., RRCConnectionReconfiguration) sent by a source eNB to an unmanned aerial vehicle UAV in step S701' includes not only adjacent cells of the source cell but also other cells (for example, adjacent cells of the adjacent cells) than the adjacent cells, and measurement results included in a measurement report sent by the unmanned aerial vehicle in step S702' include not only measurement results of the adjacent cells but also measurement results of the other cells than the adjacent cells. Specific operations in steps S701' and S702' are the same as those in steps S701 and S702 described above with reference to FIG. 7A, which are not repeated herein. The operations in the subsequent steps are substantially the same as those in the conventional technology, which are not described in detail herein.

In addition, the configuration unit 202 may be further configured to: if the deviation between the flight trajectory of the user equipment and the historical flight trajectory is smaller than or equal to the predetermined threshold, i.e., the deviation is insufficient to affect the selection of the subsequent target cell, configure the user equipment to perform a simplified handover procedure instead of the traditional handover procedure. This is because the flight trajectory of the user equipment is substantially consistent with the historical trajectory, so that the subsequent cell handover sequence is necessarily the same as the historical order. In this case, since a succeeding target cell of the user equipment is known, it is not necessary to configure the user equipment to measure all possible target cells in the range of measured cells as in the traditional handover procedure, which undoubtedly results in large resource waste. Therefore, preferably, the user equipment may be configured to perform a measurement for only the current serving cell and the succeeding target cell, and the base station may determine, according to measurement results of the current serving cell and the succeeding target cell, when the user equipment performs the handover from the current serving cell to the succeeding target cell. In this way, the handover procedure can be greatly simplified, and the measurement load of the user equipment and the processing load of the base station are significantly reduced.

The simplified handover procedure includes: acquiring a target cell handover sequence of the user equipment according to the mobility history report of the user equipment; notifying the target cell handover sequence to the user equipment and the succeeding target cell, and configuring the user equipment to perform a measurement for only the current serving cell and the succeeding target cell; and decide the user equipment to perform a handover from the current serving cell to the succeeding target cell if it is determined that a measurement result of the succeeding target cell and a measurement result of the current serving cell which are reported by the user equipment satisfy a predetermined handover condition. This simplified handover procedure is described in detail below with reference to flowcharts shown in FIGS. 8A to 8D.

Figure 8A:
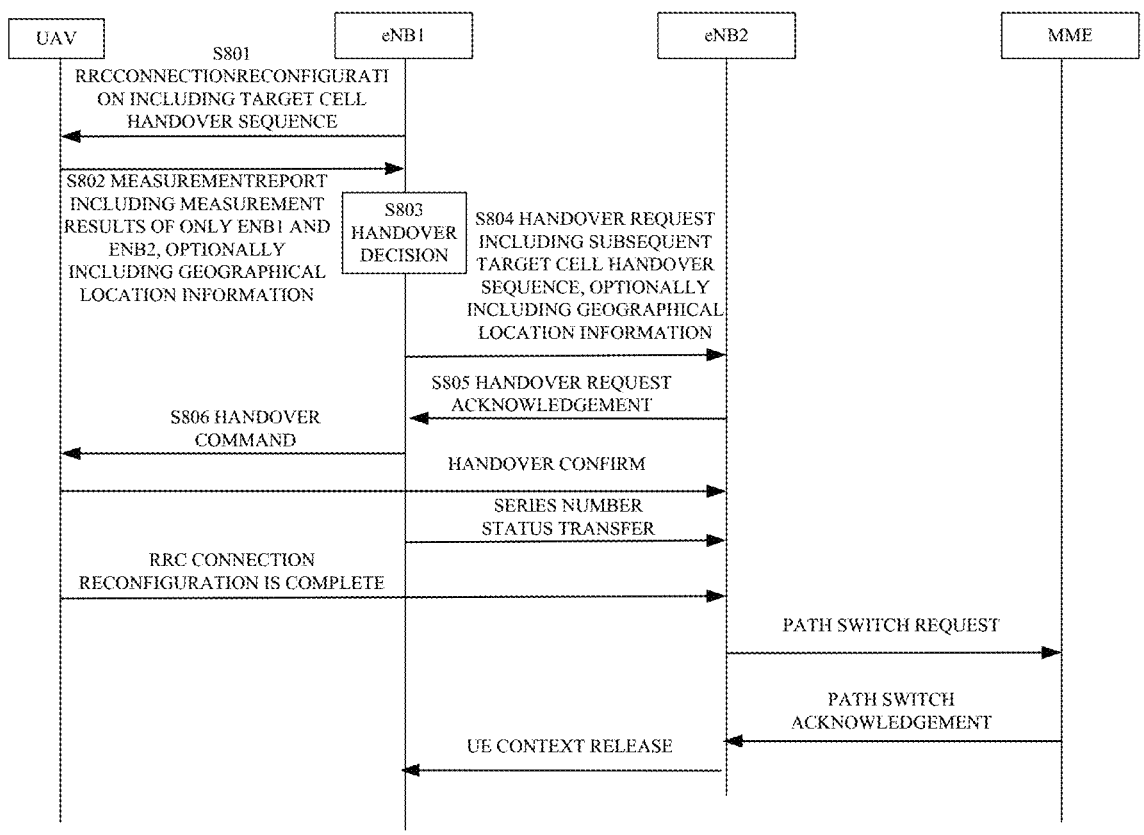
FIGS. 8A and 8B are schematic diagrams showing an example of a simplified handover procedure based on an X2 interface according to the first embodiment of the present disclosure.
Figure 8B:
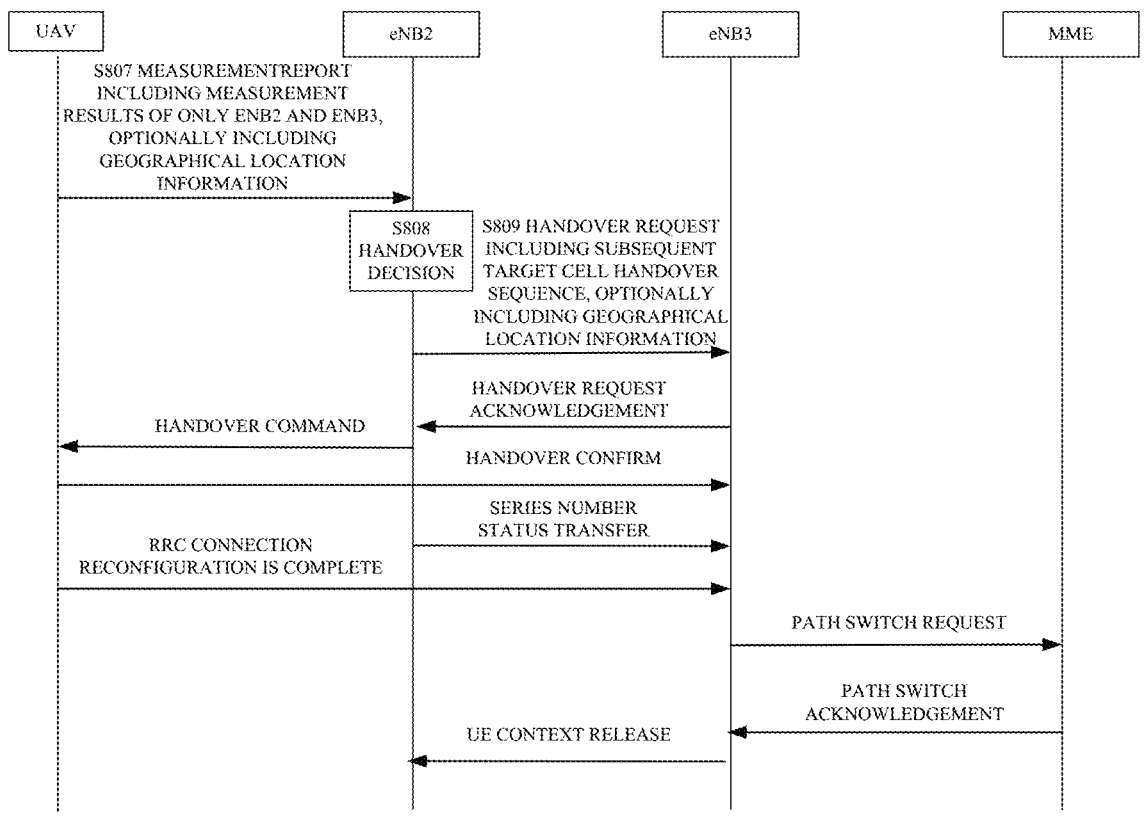

It is assumed that a current serving base station of an unmanned aerial vehicle UAV is eNB1, and a target cell handover sequence of the user equipment obtained according to the mobility history report is eNB1→eNB2→eNB3. FIGS. 8A and 8B are flowcharts showing an example of a simplified handover procedure based on an X2 interface according to the first embodiment of the present disclosure.

As shown in FIG. 8A, in step S801, the eNB1 as a source base station transmits an RRC message (RRCConnection- Reconfiguration) to the unmanned aerial vehicle UAV to notify the obtained target cell handover sequence (eNB1→eNB2→eNB3) to the unmanned aerial vehicle UAV, and configures the unmanned aerial vehicle UAV to perform a measurement for only a current serving base station and a succeeding target base station. After receiving the RRCConnectionReconfiguration, the unmanned aerial vehicle UAV performs a measurement for only the current serving base station eNB1 and the succeeding target base station eNB2, and the unmanned aerial vehicle UAV includes measurement results about the current serving base station eNB1 and the succeeding target base station eNB2 in the measurement report to be reported to the base station eNB1 in step S802. Then, in step S803, the source base station eNB1 performs a handover decision according to the received measurement results. For example, the source base station eNB1 may determine that the unmanned aerial vehicle UAV performs a handover from the base station eNB1 to the base station eNB2 if the measurement result of the succeeding target base station eNB2 being better than the measurement result of the current target base station eNB1 exceeds a predetermined threshold. Then, in step S804, the base station eNB1 makes a handover request to the base station eNB2, and includes the subsequent target cell handover sequence (eNB2→eNB3) in the handover request to transmit to the base station eNB2. Then, in step S805, the base station eNB2 transmits a handover request confirmation to the base station eNB1 if it is determined that the unmanned aerial vehicle UAV is allowed to access. Next, in step S806, the base station eNB1 transmits a handover command to the unmanned aerial vehicle UAV to instruct the unmanned aerial vehicle UAV to perform a handover to the base station eNB2. The operations in the subsequent handover procedure are substantially the same as those in the conventional technology, which are not described in detail herein.

As shown in FIG. 8B, since the unmanned aerial vehicle UAV has known the subsequent target cell handover sequence, after the handover to the base station eNB2, the base station eNB2 does not need to perform a measurement configuration on the unmanned aerial vehicle UAV, and the unmanned aerial vehicle UAV will perform a measurement on the current serving base station eNB2 and the succeeding target base station eNB3 according to the target cell handover sequence. In step S807, the unmanned aerial vehicle UAV includes measurement results about the base stations eNB2 and eNB3 in the measurement report to be reported to the base station eNB2. In step S808, the base station eNB2 performs a handover decision according to the received measurement results, and determines that the unmanned aerial vehicle UAV performs the handover from the base station eNB2 to the base station eNB3 if it is determined that, for example, the measurement result of the base station eNB3 being better than the measurement result of the base station eNB2 exceeds the predetermined threshold. In step S809, the base station eNB2 makes a handover request to the base station eNB3, and includes the subsequent target cell handover sequence in the handover request to transmit to the base station eNB3. In this example, since the base station eNB3 is the last target base station, the handover request actually does not include the subsequent target cell handover sequence. The operations in the subsequent steps are the same as those in the corresponding steps shown in FIG. 8A, which are not repeated herein.

The handover procedure described above with reference to FIGS. 8A and 8B is described on the assumption that the actual flight trajectory is substantially consistent with the historical flight trajectory. In practice, the unmanned aerial vehicle UAV may deviate from the historical flight trajectory for some reason. In this case, if the unmanned aerial vehicle is still configured to perform the measurement according to the historical target cell handover sequence, a handover failure may occur. Therefore, in the example shown in FIGS. 8A and 8B, the measurement report from the unmanned aerial vehicle UAV and the handover request to the target base station preferably further include geographical location information (including height information, latitude and longitude, etc.) of the unmanned aerial vehicle, in order for the current serving base station to: determine whether the flight trajectory of the unmanned aerial vehicle deviates from the historical flight trajectory, and in the case of deviating from the historical flight trajectory, perform a measurement and report a configuration in order for the target base station to determine whether to allow the unmanned aerial vehicle to access and perform a time-frequency resource allocation on the unmanned aerial vehicle, etc. In the case of determining that the current flight trajectory deviates from the historical trajectory, the current serving base station retransmits the RRCConnectionReconfiguration to perform a measurement configuration on the unmanned aerial vehicle, includes the range of measured cells determined according to the current height information in the RRCConnectionReconfiguration, and configures the unmanned aerial vehicle to perform the traditional handover procedure, instead of performing the handover decision based on the measurement report as shown in FIG. 8A and FIG. 8B.

Figure 8C:
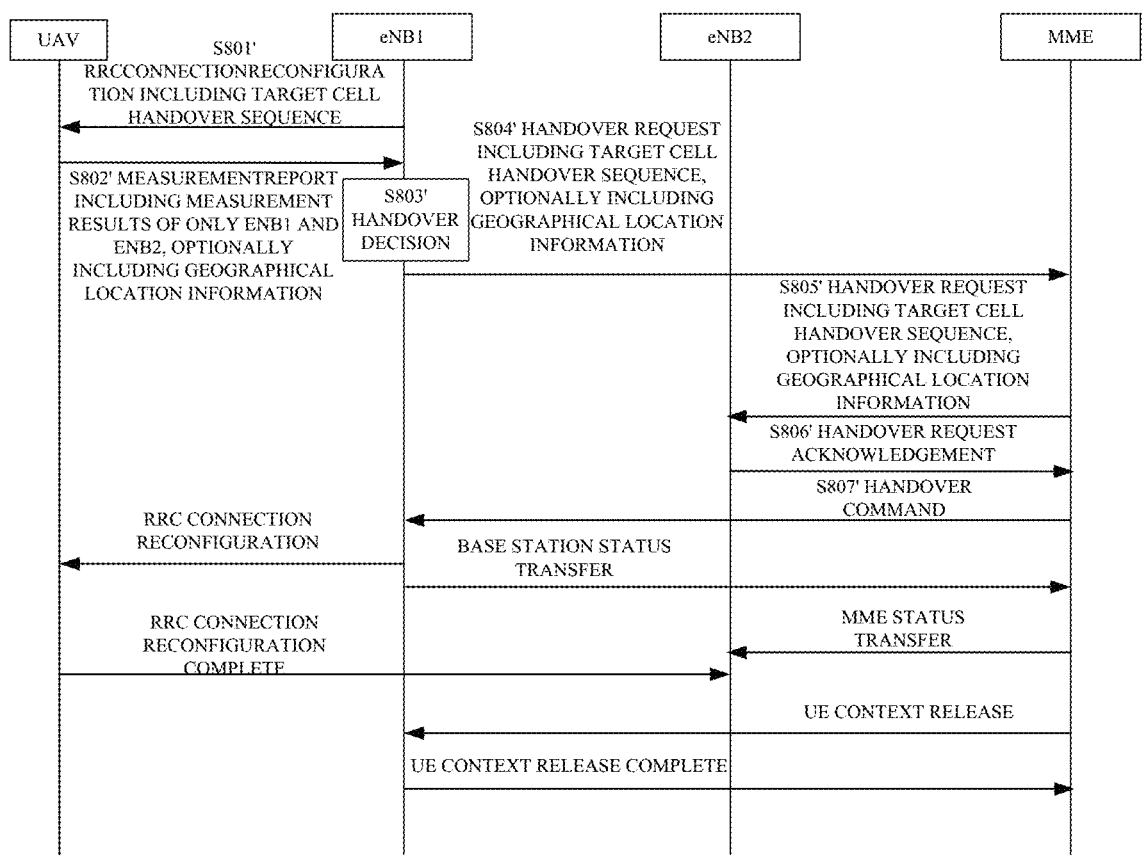
FIGS. 8C and 8D are schematic diagrams showing an example of a simplified handover procedure based on an S1 interface according to the first embodiment of the present disclosure.
Figure 8D:
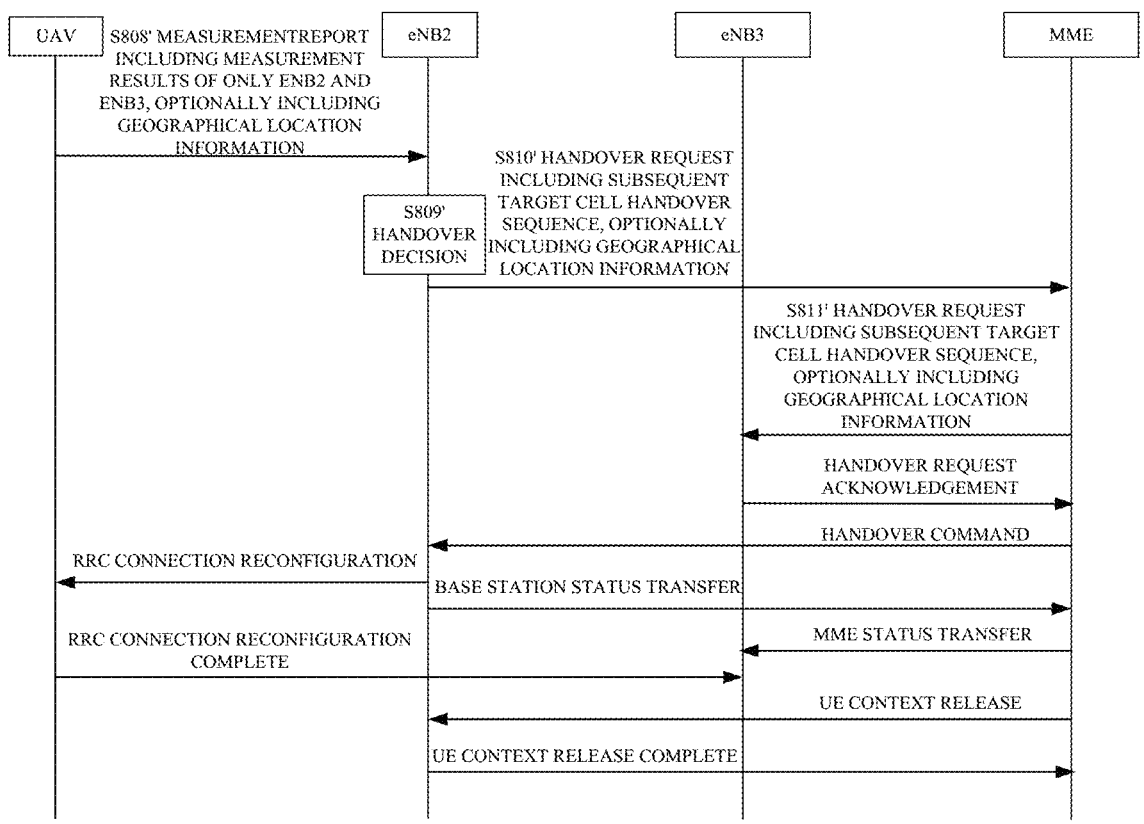

FIGS. 8C and 8D are flowcharts showing an example of a simplified handover procedure based on an S1 interface according to the first embodiment of the present disclosure.

The handover procedure shown in FIG. 8C and FIG. 8D is substantially the same as the handover procedure shown in FIG. 8A and FIG. 8B, except that the base stations cannot directly communicate with each other, and thus the related information is forwarded by a device (mobility management entity MME) at the core network side. The simplified handover procedure based on the S1 interface is briefly described below with reference to FIGS. 8C and 8D.

The operations in steps S801' to S803' in FIG. 8C are the same as those in steps S801 to S803 in FIG. 8A, which are not repeated herein. Only differences from the handover procedure shown in FIG. 8A are described below.

Specifically, after the source base station eNB1 makes a handover decision in step S803', the source base station eNB1 then makes a handover request to the MME through a message "HandoverRequired" of the S1 interface in step S804', where the message may carry the subsequent target cell handover sequence (eNB2→eNB3). After receiving the handover request, the MME transmits a message "HandoverRequest" to the succeeding target base station eNB2 in step S805', where the message also carries the subsequent target cell handover sequence (eNB2→eNB3). Next, in step S806', after determining that the unmanned aerial vehicle UAV is allowed to access, the target base station eNB2 transmits a message "HandoverRequest ACK" to the MME, so that the MME transmits a message "HandoverCommand" to the source base station eNB1 in step S807', to indicate the source base station eNB1 that the unmanned aerial vehicle UAV may perform a handover from the source base station eNB1 to the target base station eNB2. The operations in the subsequent steps are the same as those in the handover procedure based on the S1 interface in the conventional LTE, which are not described in detail herein.

The operations in steps S808' and S809' in FIG. 8D are the same as those in steps S807 and S808 in FIG. 8B, which are not repeated herein. Only differences from the handover procedure shown in FIG. 8B are described below. After the current serving base station eNB2 makes a handover decision in step S809', the current serving base station eNB2 then makes a handover request to the MME through a message "HandoverRequired" of the S1 interface in step S810', where the message may carry the subsequent target cell handover sequence. It should be noted that in this example, since the succeeding target base station eNB3 is the last handover target, the message actually does not include the subsequent target cell handover sequence. In other examples, if there is other handover target after the succeeding target base station, the subsequent target cell handover sequence needs to be included in the message to be transmitted to the MME. Next, after receiving the handover request, the MME transmits a message "HandoverRequest" to the succeeding target base station eNB3 in step S811', where the massage also carries the subsequent target cell handover sequence. Similarly, as described above, in this example, since there is no other handover target after the succeeding target base station eNB3, the message actually does not include the subsequent target cell handover sequence. The operations in the subsequent steps are the same as those in the corresponding steps shown in FIG. 8C, which are not repeated herein.

It should be noted that, as described above with reference to FIGS. 8A and 8B, in the handover procedure shown in FIGS. 8C and 8D, the measurement report from the unmanned aerial vehicle and the handover request to the MME or the target base station may also include geographical location information of the unmanned aerial vehicle, in order for the current serving base station to: determine whether the flight trajectory of the unmanned aerial vehicle deviates from the historical flight trajectory, and in the case of determining that the current flight trajectory deviates from the historical flight trajectory, determine the range of measured cells according to the height information included in the geographical location information, and instruct the unmanned aerial vehicle to perform the traditional handover procedure according to the determined range of measured cells.

In addition, it should further be noted that the handover procedure shown in FIG. 8A to FIG. 8D is only used for explaining the principle of the present disclosure and does not constitute any limitation to the present disclosure, and those skilled in the art may make appropriate modifications on the shown flowcharts according to the principle of the present disclosure. Such modifications should be considered to fall within the scope of the present disclosure. In addition, steps closely related to the present disclosure are merely described in detail and shown in the above description and the drawings, and steps that are well-known in the conventional technology are omitted, in order to avoid obscuring the subject matter of the present disclosure.

It can be seen according to the embodiments of the present disclosure described above that, for the feature that the unmanned aerial vehicle has a highly repetitive and fixed flight trajectory in some applications, the unmanned aerial vehicle may be configured to perform the simplified handover procedure described with reference to FIGS. 8A to 8D. In this way, the measurement load of the unmanned aerial vehicle can be greatly reduced, the power consumption is reduced, the endurance capability is improved, and the processing load of the base station is also reduced, and the handover efficiency is improved.

Referring back to FIG. 2, as another preferred example for narrowing the range of measured cells, the configuration unit 202 may be further configured to determine the range of measured cells to not include cells of which physical cell identifiers (PCIs) or cell-specific reference signals (CRSs) contradict with each other by adding the cells of which physical cell identifiers or cell-specific reference signals contradict with each other into a blacklist.

Still taking the scenario shown in FIG. 4 as an example, for the conventional UE of which the range of measured cells includes only the adjacent cells a1 to a6, the existing PCI allocation generally avoids PCI or CRS collision between the cells. However, since the PCI is limited, there may be a problem of PCI multiplexing between cells that are far apart. For example, there may be PCI multiplexing between a certain cell among the cells a1 to a6 and a certain cell among the cells c1 to c18. Since the conventional UE on the ground can only receive the downlink reference signals from the adjacent cells a1 to a6 of the serving cell, and the downlink reference signals from the cells c1 to c18 cannot be reached to the UE on the ground due to being blocked, the PCI multiplexing has no effect on the conventional UE. However, for the unmanned aerial vehicle, which can receive downlink reference signals from the cells a1 to a6, b1 to b12, and c1 to c18, the range of measured cells for the unmanned aerial vehicle includes not only the adjacent cells a1 to a6, but also the cells b1 to b12 and c1 to c18. In this case, if there is PCI multiplexing between these cells, resulting in PCI or CRS collision, the unmanned aerial vehicle cannot obtain accurate measurement results for the cells of which PCIs or CRSs contradict with each other, which may result in handover failure.

Therefore, in order to avoid such a problem caused by the PCI or CRS collision, the apparatus at the base station side may be configured to add cells of which PCIs or CRSs contradict with each other into a blacklist to be excluded from the range of measured cells.

In addition, since the range of measured cells for the UAV application is expanded from the adjacent cells to other cells than the adjacent cells, a traditional handover event needs to be adjusted accordingly. Preferably, the configuration unit 202 may be further configured to configure events A3 to A6 and B1 to B2 as triggering events based on the determined range of measured cells.

For example, the traditional event A3 is defined to trigger the reporting when the signal quality of the adjacent cell becomes better than the serving cell (the primary cell PCell/PSCell) by an offset. According to the present disclosure, the event A3 may be modified to: trigger the unmanned aerial vehicle to performing the reporting when the signal quality of the cell in the range of measured cells (the determined range of measured cells includes not only the adjacent cells, but also other cells than the adjacent cells, such as adjacent cells of the adjacent cells) becomes better than the serving cell by a certain offset.

Similarly, the event A4 may be modified such that the signal quality of the cell in the range of measured cells (not limited to the adjacent cells) becomes better a threshold.

The event A5 may be modified such that the signal quality of the serving cell (primary cell PCell/PSCell) becomes worse than a first threshold and the signal quality of the cell in the range of measured cells (not limited to the adjacent cells) becomes better than a second threshold.

The event A6 may be modified such that the signal quality of the cell in the range of measured cells (not limited to the adjacent cells) becomes better than the serving cell (secondary cell SCell) by a certain offset.

The event B1 may be modified to: trigger the reporting when the signal quality of the cell in the range of measured cells (not limited to the adjacent cells) of the inter-frequency becomes better than a threshold, to perform a handover between different radio access technologies (RATs), for example, handover from GSM to CDMA or handover from CDMA to LTE.

The event B2 may be modified such that the signal quality of the serving cell (primary cell PCell) becomes worse than a first threshold and the signal quality of the cell in the range of measured cells (not limited to the adjacent cells) of the inter-frequency becomes better than a second threshold.

Referring back to FIG. 2, the notification unit 204 may be configured to notify the determined range of measured cells to the user equipment. Specifically, the notification unit 204 may include the determined range of measured cells (for example, IDs of measured cells, such as PCI) in an RRC message (e.g., RRCConnectionReconfiguration) to be notified to the user equipment. In this way, after receiving the range of measured cells, the user equipment measures downlink reference signals of cells in the range of measured cells according to corresponding measurement configuration parameters. In the case of satisfying a reporting trigger condition (periodically or when satisfying reporting triggering events including the modified reporting triggering events A3 to A6 and B1 to B2, the user equipment reports the measurement results about the corresponding cells in the range of measured cells to the base station, in order for the base station to perform the corresponding decision operation.

Preferably, the configuration unit 202 may be further configured to update the range of measured cells upon establishment of an RRC connection or in response to a request issued by the user equipment in a case that a flight state of the unmanned aerial vehicle changes. The notification unit 204 may notify the updated range of measured cells to the user equipment.

Specifically, each time an RRC idle (RRC_IDLE) state is transitioned to an RRC connection (RRC_CONNECTED) state, that is, upon establishment of the RRC connection, the configuration unit 202 at the base station side may send a message RRCConnectionReconfiguration to the user equipment, to transmit measurement configuration including the determined range of measured cells to the user equipment. Alternatively, the flight height and the flight speed of the unmanned aerial vehicle during flight may vary. In this case, if the unmanned aerial vehicle and the base station remain in the RRC connection state, the base station cannot be timely triggered to transmit the range of measured cells suitable for the current situation. Therefore, in order to solve the problem, the unmanned aerial vehicle may be configured to: if it is detected that a change in the flight state (including one or more of flight height, flight speed, flight direction, flight trajectory, etc.) of the unmanned aerial vehicle exceeds a predetermined threshold, send a request to the base station, to trigger the base station to update the range of measured cells according to the current flight state of the unmanned aerial vehicle, so as to avoid the handover failure which thus affects the communication performance.

According to the embodiments of the present disclosure described above, for the feature that the flight height and/or the flight speed of the unmanned aerial vehicle may be larger than that of the conventional UE on the ground, the range of measured cells for the unmanned aerial vehicle is expanded from the adjacent cells to other cells than the adjacent cells, to avoid the problem of frequent handover caused by the conventional measurement configuration. In addition, in order to further solve the problem of increased measurement load and processing load due to the expanded range of measured cells, one or more of factors such as the flight trajectory of the unmanned aerial vehicle, the flight direction of the unmanned aerial vehicle, and the PCI or CRS collision may be taken in consideration to narrow the range of measured cells and/or simplify the handover procedure, to reduce the measurement load and processing load while reducing the handover frequency.

It should be noted that the various functional units described above with reference to FIG. 2 are merely logical modules that are divided according to implemented specific functions, and are not intended to limit the specific implementation. In the actual implementation, the functional units and modules described above may be implemented as separate physical entities or may be implemented by a single entity (e.g., a processor (for example, CPU or DSP), or an integrated circuit).

In addition, it should further be noted that the apparatus 200 described above with reference to FIG. 2 may be implemented at the chip level, or may also be implemented at the device level by including other external components. For example, the apparatus 200 may operate as a base station itself, and may include a communication unit (which is optional and is shown by a dashed box) for performing communication operations. For example, the communication unit may be used to perform a communication with other base stations, the core network, the user equipment, and the like. In addition, it should further be noted that the specific implementation form of the communication unit is not limited herein. The communication unit may include one or more communication interfaces to achieve communication with different external devices.

[1-2. Configuration Example of Apparatus at User Equipment Side]

Corresponding to the embodiment of the apparatus at the base station side described above, an embodiment of an apparatus at a user equipment side is described below.

Figure 9:
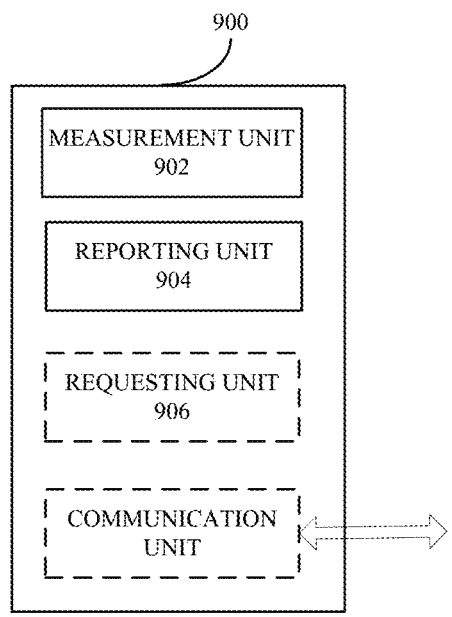
FIG. 9 is a block diagram showing a functional configuration example of an apparatus at a user equipment side in a wireless communication system according to the first embodiment of the present disclosure.

FIG. 9 is a block diagram showing a functional configuration example of an apparatus at a user equipment side in a wireless communication system according to the first embodiment of the present disclosure.

As shown in FIG. 9, an apparatus 900 according to this embodiment may include a measurement unit 902 and a reporting unit 904.

The measurement unit 902 may be configured to perform a measurement according to a range of measured cells notified by a base station. The range of measured cells includes adjacent cells of a current serving cell of the user equipment and other cells than the adjacent cells. The specific process of determining the range of measured cells may refer to the corresponding description in the embodiment of the apparatus at the base station side, which is not repeated herein. Preferably, in a case that a current height of the user equipment is below a predetermined threshold, that is, in a case that the unmanned aerial vehicle operates as a conventional UE on the ground without opening the flying mode, the range of measured cells may only include the adjacent cells.

Specifically, the measurement unit 902 may be configured to measure a downlink reference signal (e.g., CRS) of each cell in the range of measured cells to obtain RSRP/RSRQ for the cell.

The reporting unit 904 may be configured to report the measurement results to the base station in order for the base station to perform a relevant decision. Specifically, the reporting unit 904 may be configured to include measurement results of cells satisfying a report condition in a message "MeasurementReport" to be reported to the base station. After receiving the measurement results, the base station performs, for example, a handover decision, including whether to perform a handover and selection of a handover target cell.

Preferably, the reporting unit 904 may be further configured to report one or more of height information, geographical location information, flight speed information and flight direction information related to the user equipment to the base station in order for the base station to determine the range of measured cells. As described above, in order to help the base station to more accurately determine the range of measured cells, to narrow the range of measured cells so as to reduce the measurement load of the user equipment and the processing load of the base station, the reporting unit 904 may, for example, include one or more of the height information, the geographical location information, the flight speed information and the flight direction information related to the user equipment in the RRC message "MeasurementReport" to be reported to the base station. Alternatively, the information may be carried by a MAC layer control element (CE) or physical layer signaling (for example, uplink control information UCI) or any combination of the above three layers of signaling, which is not limited in the present disclosure.

In addition, preferably, the user equipment may perform different handover procedures according to a configuration made by the base station based on a flight trajectory and a historical flight trajectory of the user equipment.

Specifically, in a case that the base station configures the user equipment to perform a traditional handover procedure according to the flight trajectory of the user equipment and the historical flight trajectory (for example, a deviation between the flight trajectory of the user equipment and the historical flight trajectory is greater than a predetermined threshold), the measurement unit 902 in the apparatus 900 at the user equipment side may be configured to perform a measurement according to the range of measured cells notified by the base station, and the reporting unit 904 may be configured to report measurement results of cells satisfying the report condition in the range of measured cells to the base station, in order for the base station to perform the handover decision. The handover procedure in this case may refer to the description above with reference to FIGS. 7A and 7B, which is not repeated herein.

In addition, in a case that the base station configures the user equipment to perform a simplified handover procedure according to the flight trajectory of the user equipment and the historical flight trajectory (for example, the deviation between the flight trajectory of the user equipment and the historical flight trajectory is less than or equal to the predetermined threshold), the measurement unit 902 performs a measurement for only a current serving cell and a succeeding target cell according to a target cell handover sequence notified by the base station, and the reporting unit 904 reports measurement results about the current serving cell and the succeeding target cell to the current serving cell if the report condition is satisfied.

In addition, the measurement unit 902 may be further configured to: after the user equipment performs a handover from the current serving cell to the succeeding target cell in response to an instruction sent by the base station in a case that a measurement result of the succeeding target cell and a measurement result of the current serving cell which are reported by the user equipment satisfy a predetermined handover condition, perform a measurement on the succeeding target cell (in this case, the current serving cell) and a target cell succeeding to the succeeding target cell which is determined based on the target cell handover sequence. The reporting unit 904 may be further configured to report the measurement results about the succeeding target cell and the target cell to the succeeding target cell as the current serving cell if the report condition is satisfied, in order for the current serving cell to perform a handover decision. The simplified handover procedure in this case may refer to the description above with reference to FIGS. 8A to 8D, which is not repeated herein.

Preferably, in a case that the measurement and report is performed based on event triggering, the reporting unit 904 is further configured to: if it is determined based on the range of measured cells notified by the base station that the triggering events A3 to A6 and B1 to B2 are satisfied, report measurement results of cells satisfying the configured triggering events in the range of measured cells to the base station, in order for the base station to perform the relevant decision. As described above, since the range of measured cells for the unmanned aerial vehicle is expanded to include other cells than the adjacent cells, the conventional events A3 to A6 and B1 to B2 applicable only to the adjacent cells are correspondingly modified as triggering events based on the expanded range of measured cells (not limited to the adjacent cells). The modified triggering events A3 to A6 and B1 to B2 may refer to the corresponding description above, which is not repeated herein.

Further, in order to avoid a problem such as handover failure or handover delay due to a failure to timely update the range of measured cells in the case that the flight state of the unmanned aerial vehicle changes, the apparatus 900 according to this embodiment may preferably further include a requesting unit 906 (which is optional and is shown by a dashed box). The requesting unit 906 may be configured to: in a case that a flight state of the user equipment changes, make a request to the base station to trigger the base station to update the range of measured cells for the user equipment. Specifically, when the change in the flight state (including one or more of the flight height, the flight speed, the flight direction, the flight trajectory, and the like) of the unmanned aerial vehicle exceeds a predetermined threshold, the requesting unit 906 may actively request the base station to update the range of measured cells, and include information about the current flight state of the unmanned aerial vehicle in the request to be reported to the base station, to help the base station to more accurately determine the range of measured cells suitable for the current flight state.

It should be noted that the embodiment of the apparatus at the user equipment side described herein corresponds to the embodiment of the apparatus at the base station side described above. The content that is not described in detail herein may refer to the corresponding description above, which is not repeated herein.

It should further be noted that the various functional units described above with reference to FIG. 9 are merely logical modules that are divided according to implemented specific functions, and are not intended to limit the specific implementation. In the actual implementation, the functional units and modules described above may be implemented as separate physical entities or may be implemented by a single entity (e.g., a processor (for example, CPU or DSP), or an integrated circuit).

In addition, it should further be noted that the apparatus 900 described above with reference to FIG. 9 may be implemented at the chip level, or may also be implemented at the device level by including other external components. For example, the apparatus 900 may operate as a user equipment itself, and may include a communication unit (which is optional and is shown by a dashed box) for performing communication operations. For example, the communication unit may be used to perform a communication with the base station, other user equipments, and the like. In addition, it should further be noted that the specific implementation form of the communication unit is not limited herein. The communication unit may include one or more communication interfaces to achieve communication with different external devices.

In addition, it should be understood that although the apparatus embodiments (including the apparatus at the base station side and the apparatus at the user equipment side) of the present disclosure have been described above with reference to the drawings, the described embodiments are merely exemplary but not limitative. Those skilled in the art may make modifications on illustrated functional configuration examples according to the principle of the present disclosure, for example, add, delete, change, or combine the functional modules, and all such variations should be considered to fall within the scope of the present disclosure.

[1-3. Method Embodiment]

Corresponding to the above apparatus embodiments, the following method embodiments are further provided in the present disclosure. A method in a wireless communication system according to the embodiment of the present disclosure is described below with reference to FIGS. 10 and 11.

Figure 10:
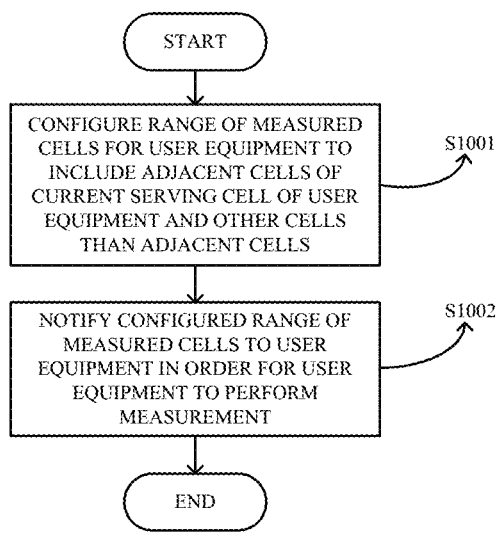
FIG. 10 is a flowchart showing a process example of a method at a base station side in a wireless communication system according to the first embodiment of the present disclosure.

FIG. 10 is a flowchart showing a process example of a method at a base station side in a wireless communication system according to the first embodiment of the present disclosure.

As shown in FIG. 10, the method starts at step S1001. In step S1001, a range of measured cells for a user equipment is configured to include adjacent cells of a current serving cell of the user equipment and other cells than the adjacent cells.

For an unmanned aerial vehicle whose flight height exceeds a predetermined threshold so as to have an operating characteristic different from that of a conventional UE on the ground, in order to avoid, for example, frequent handover, the range of measured cells for the unmanned aerial vehicle in this state may be expanded to further include other cells than the adjacent cells. In addition, in a case that the unmanned aerial vehicle is parked on the ground, has just flown away, or has a flight height below a predetermined height threshold, the unmanned aerial vehicle can be regarded as a conventional UE on the ground, and the range of measured cells may be configured to include only the adjacent cells.

Preferably, in step S1001, the range of measured cells may be determined further according to one or more of factors such as a flight speed, a flight direction, and a flight trajectory of the user equipment, to narrow the range of measured cells and/or simplify the handover procedure, to reduce the measurement load and the processing load while reducing the handover frequency. Preferably, in step S1001, cells of which PCIs or CRSs contradict with each other may be added into a blacklist such that the range of measured cells does not include the cells, thereby further narrowing the range of measured cells and improving the handover accuracy. The specific process of determining the range of measured cells may refer to the corresponding description in the above apparatus embodiment, which is not repeated herein.

Next, the method proceeds to step S1002. In step S1002, the determined range of measured cells is notified to the user equipment in order for the user equipment to perform a measurement and report based on the range of measured cells.

Preferably, the determination and notification of the range of measured cells in steps S1001 and S1002 may be performed upon establishment of an RRC connection or in response to a request issued by the user equipment in a case that the flight state changes.

It should be noted that the method embodiments described herein correspond to the embodiments of the apparatus at the base station side described above. The content that is not described in detail herein may refer to the corresponding description above, which is not repeated herein.

Figure 11:
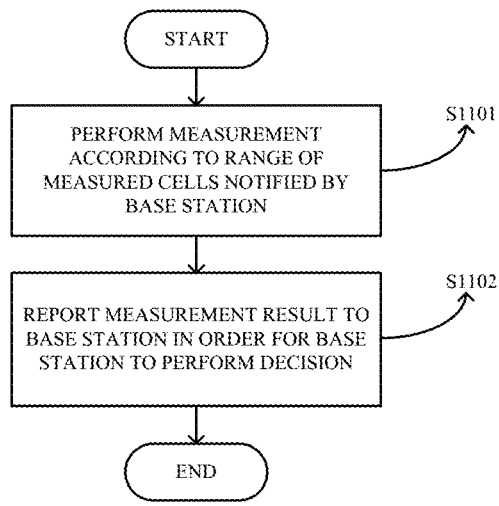
FIG. 11 is a flowchart showing a process example of a method at a user equipment side in a wireless communication system according to the first embodiment of the present disclosure.

FIG. 11 is a flowchart showing a process example of a method at a user equipment side in a wireless communication system according to the first embodiment of the present disclosure.

As shown in FIG. 11, the method according to this embodiment starts at step S1101. In step S1101, a measurement is performed according to a range of measured cells notified by a base station. The range of measured cells may include adjacent cells of a current serving cell of a user equipment and other cells than the adjacent cells.

Then, the method proceeds to step S1102. In step S1102, measurement results about cells satisfying a report condition in the range of measured cells are reported to the base station in order for the base station to perform a relevant decision, for example, a handover decision.

Preferably, the method may further include reporting one or more of height information, geographical location information, flight speed information and flight direction information of the user equipment to the base station in order for the base station to determine the range of measured cells. One or more of these information may be reported to the base station by one or more of an RRC message (specifically, for example, MeasurementReport), MAC CE, or physical layer signaling (for example, uplink control information UCI).

Preferably, the method may further include performing a traditional handover procedure or a simplified handover procedure according to a configuration made by the base station based on a flight trajectory and a historical flight trajectory of the user equipment. The related description may refer to the description above with reference to FIG. 7A to FIG. 8D, which is not repeated herein.

Preferably, the method may further include: in a case that the flight state of the user equipment changes, making a request to the base station to trigger the base station to update the range of measured cells for the user equipment.

It should be noted that the method embodiments described herein correspond to the embodiments of the apparatus at the user equipment side described above. The content that is not described in detail herein may refer to the corresponding description above, which is not repeated herein.

In addition, it should be noted that the flowcharts shown in FIGS. 10 and 11 are merely exemplary but not limitative. Those skilled in the art may make modifications on illustrated processing flow examples according to the principle of the present disclosure, for example, add, delete, change, or combine the steps, and all such variations should be considered to fall within the scope of the present disclosure.

According to the first embodiment of the present disclosure described above, by expanding the range of measured cells for the unmanned aerial vehicle to further include other cells than the adjacent cells, the frequent handover can be avoided. Further, by narrowing the range of measured cells according to the specific height information, speed information, direction information, and the like, to configure a more reasonable range of measured cells for the unmanned aerial vehicle, the measurement load and the processing load can be further reduced.

2. Second Embodiment (Other Parameter Configuration in Measurement and Report Configuration)

In the above-described first embodiment, the configuration of the range of measured cells applicable to the unmanned aerial vehicle is described, solving the problem of frequent handover. However, since the flight height and flight speed of the unmanned aerial vehicle are quite different from those of a conventional UE on the ground, other parameters in the conventional measurement and report configuration need to be properly configured to improve accuracy of related operations (for example, handover operation) based on the measurement and report configuration.

[2-1. Configuration Example of Apparatus at Base Station Side]

Figure 12:
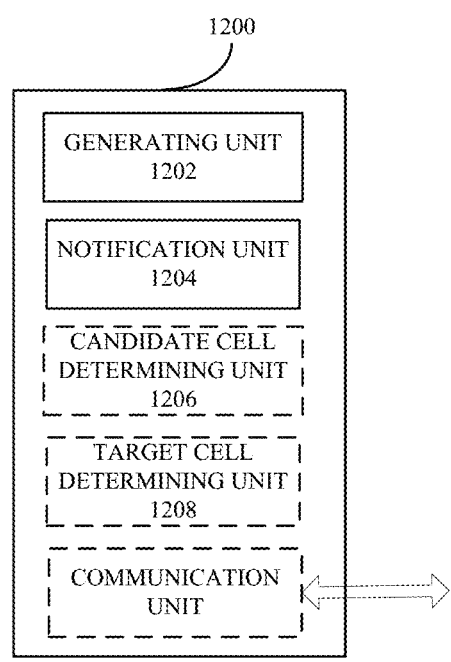
FIG. 12 is a block diagram showing a functional configuration example of an apparatus at a base station side in a wireless communication system according to a second embodiment of the present disclosure.

FIG. 12 is a block diagram showing a functional configuration example of an apparatus at a base station side in a wireless communication system according to a second embodiment of the present disclosure.

As shown in FIG. 12, an apparatus 1200 according to this embodiment may include a generating unit 1202 and a notification unit 1204.

The generating unit 1202 may be configured to generate measurement and report configuration related information based on at least height information of a user equipment. The measurement and report configuration related information includes, but is not limited to, at least information related to one or more parameters of a serving cell quality threshold (s-Measure), a threshold (e.g., aN-Threshold) satisfying a report condition, a hysteresis parameter (Hysteresis), a duration (timeToTrigger) during which a report condition is satisfied to trigger reporting, a maximum number (maxReportCells) of report cells, a trigger quantity (triggerQuantity), a report quantity (reportQuantity), and a reporting interval (reportInterval).

The following description is given by taking the serving cell quality threshold (s-Measure) as an example, of which the function is to monitor quality of the serving cell. In a case that an RSRP/RSRQ measurement value of the serving cell is lower than the s-Measure, the user equipment is triggered to perform a related measurement. However, as described above, in the case that the flight height of the unmanned aerial vehicle is high (for example, higher than a predetermined height threshold to open the flying mode), even if the unmanned aerial vehicle is physically far away from the current serving cell, the RSRP/RSRQ value of the serving cell measured by the unmanned aerial vehicle is still relatively high due to the LoS. In this case, the following problem occurs under the same s-Measure value as the conventional UE on the ground. The measured RSRP value of the serving cell is always higher than the s-Measure value, thereby delaying the unmanned aerial vehicle to perform a measurement on cells (which may include only the adjacent cells, or may include not only the adjacent cells as described in the first embodiment) in the range of measured cells, thus causing the handover of the unmanned aerial vehicle to be delayed. In this case, the communication of the unmanned aerial vehicle may have interference to other base stations or conventional UEs on the ground.

Figure 13:
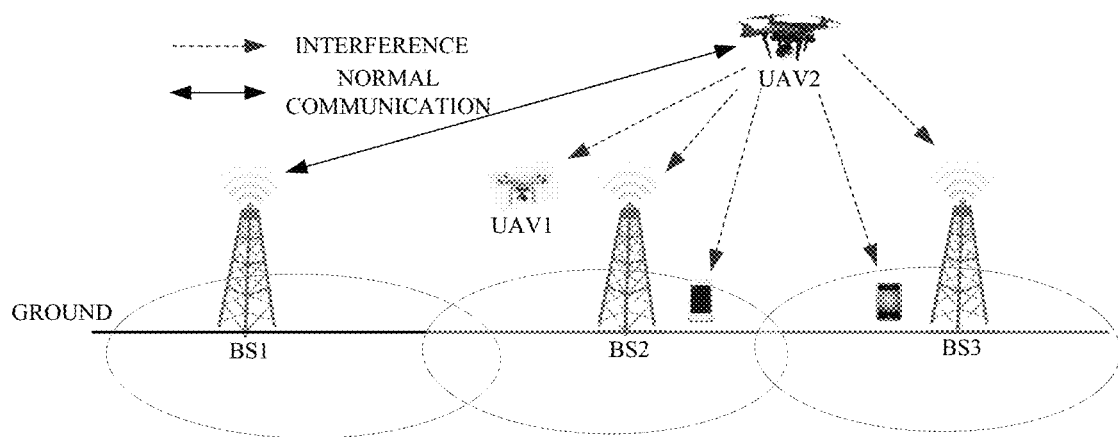
FIG. 13 is a schematic diagram showing an example of a communication scenario according to the second embodiment of the present disclosure.

FIG. 13 shows an example of a communication scenario in this case. As shown in FIG. 13, a serving base station of an unmanned aerial vehicle UAV2 is BS1. Due to the LoS, the RSRP/RSRQ value of the base station BS1 measured by the UAV2 is relatively large, for example, always higher than the s-Measure value configured for a conventional UE on the ground. In this case, although the UAV 2 is already physically away from the base station BS1, the unmanned aerial vehicle UAV2 does not initiate the related measurement operation since the measured RSRP/RSRQ value is always higher than the s-Measure value. Thus, not only the handover of the unmanned aerial vehicle UAV 2 is delayed, but also the unmanned aerial vehicle UAV 2 has interference to base stations BS2 and BS3, an unmanned aerial vehicle UAV1, and a UE on the ground.

For another example, for the duration (timeToTrigger) during which a report condition is satisfied to trigger reporting, the function of the duration is to trigger the reporting of the measurement result only when a duration during which the report condition is satisfied exceeds the value of timeToTrigger. If the value of the parameter timeToTrigger for the unmanned aerial vehicle is set to be the same as that of the conventional UE on the ground, the problem of ping-pong handover or delayed handover may be caused by the fact that the flight height and the flight speed of the unmanned aerial vehicle are generally larger than those of the conventional UE on the ground.

Similarly, similar problems exist for the other parameters listed above or other parameters related to the measurement and report configuration. In other words, the measurement and report configuration for the conventional UE on the ground is not applicable to the unmanned aerial vehicle in some cases (i.e., in a case that the flight height of the unmanned aerial vehicle exceeds a certain threshold and thus the unmanned aerial vehicle cannot be regarded as a conventional UE). Therefore, the measurement and report configuration specific to the unmanned aerial vehicle is required to be set for the characteristics of the unmanned aerial vehicle. The measurement and report configuration is related to at least the height information.

In addition, as described above, in the case that the flight height of the unmanned aerial vehicle is lower than the predetermined height threshold, the unmanned aerial vehicle can be regarded as a conventional UE on the ground. The generating unit 1202 may configure, for the unmanned aerial vehicle in this case, the same or similar measurement and report configuration as the conventional UE on the ground. That is, different measurement and report configurations may be configured according to the flight height of the unmanned aerial vehicle, including at least the conventional measurement and report configuration and the measurement and report configuration specific to the unmanned aerial vehicle.

Referring back to FIG. 12, the notification unit 1204 may be configured to notify the generated measurement and report configuration related information to the user equipment in order for the user equipment to perform a measurement and report based on the measurement and report configuration related information.

Figure 14:
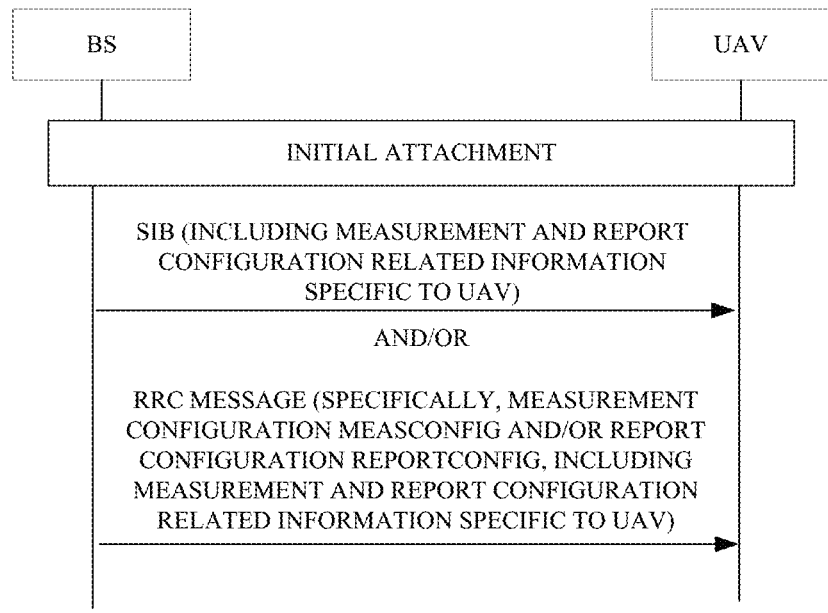
FIG. 14 is a flowchart schematically showing an example of a configuration process of measurement and report configuration related information according to the second embodiment of the present disclosure.

Specifically, the notification unit 1204 may be further configured to notify the measurement and report configuration related information to the user equipment by a system message and/or an RRC message. FIG. 14 shows an example of a configuration process of measurement and report configuration related information according to the second embodiment of the present disclosure.

As shown in FIG. 14, after the unmanned aerial vehicle UAV completes initial attachment to the base station BS, the base station may configure specific measurement and report configuration related information for the unmanned aerial vehicle by a system message (which may be an existing system information block (SIB) or may be a newly added system message). Alternatively or in combination with the above, the base station may notify the user equipment by an RRC message (specifically, an information element "MeasConfig" and/or "ReportConfig").

Preferably, as an implementation example, considering that the height information is an important factor affecting the measurement and report configuration of the unmanned aerial vehicle, the measurement and report configuration related information generated by the generating unit 1202 may further include a height state parameter for determining one or more height states. The height state parameter may be defined as, for example, HeightStateParameters, and may be included in a system message for broadcast or in an RRC message (specifically, in the information element MeasConfig) for configuration. The height state parameter may include predetermined one or more height thresholds for determining a height state at which the user equipment is located. It is assumed herein that the user equipment has two height states, i.e., HighHeightState and MediumHeightState. In practice, the user equipment may have more height states, which is not limited in the present disclosure. An example of a definition of the height state HeightStateParameters is given below.

HeightStateParameters

```
-- ASN1START
HeightStateParameters ::=    SEQUENCE {
    n-HeightMedium           ENUMERATED {50, 100, 150, 200, 250}
    n-HeightHigh             ENUMERATED {50, 100, 150, 200, 250}
}
-- ASN1STOP
``` where n-HeightMedium indicates that, the user equipment is in the height state MediumHeightState in a case that the current height of the user equipment is greater than or equal to n-HeightMedium and less than n-HeightHigh; and n-HeightHigh indicates that, the user equipment is in the height state HighHeightState in a case that the current height of the user equipment is greater than or equal to n-HeightHigh. The n-HeightMedium and n-HeightHigh herein may correspond to height thresholds for determining a height interval in which the user equipment is located or may be determined according to the height thresholds. In addition, it should be noted that, values {50, 100, 150, 200, 250} of the n-HeightMedium and n-HeightHigh listed above are merely illustrative but not limitative, and may be empirical values determined by those skilled in the art according to a limited number of experiments in combination with actual circumstances, which is not limited in the present disclosure.

Further, preferably, the generated measurement and report configuration related information may further include one or more height related scale factors corresponding to the one or more height states. The one or more height related scale factors may be defined as, for example, HeightStateScaleFactors, and may also be included in a system message for broadcast or in an RRC message (specifically, in MeasConfig) for configuration. The user equipment may firstly determine the height state thereof according to the height state parameter HeightStateParameters described above, and then select, according to the height state, a height related scale factor suitable for the current height state from the HeightStateScaleFactors, to correct related parameters in the measurement and report configuration related information notified by the base station.

Corresponding to the height state parameter HeightStateParameters defined above, an example of definitions of height related scale factors respectively corresponding to height states HighHeightState and MediumHeightState is given below.

HeightStateScaleFactors

```
-- ASN1START
HeightStateScaleFactors ::=    SEQUENCE {
    hf-Medium    ENUMERATED {0Dot25, 0Dot5, 0Dot75, 1Dot0, 1Dot25, 1Dot5},
    hf-High      ENUMERATED {0Dot25, 0Dot5, 0Dot75, 1Dot0, 1Dot25, 1Dot5}
}
-- ASN1STOP
```

The above definitions indicate that, if the height state HighHeightState is detected, that is, if the current height of the user equipment is greater than or equal to n-HeightHigh, the height related scale factor hf-High is applied to correct the related parameters; if the height state MediumHeightState is detected, that is, if the current height of the user equipment is greater than or equal to n-HeightMedium and less than n-HeightHigh, the height related scale factor hf-Medium is applied to correct the related parameters; and if neither the height state HighHeightState nor the height state MediumHeightState is detected, no height related scale factor is applied. The values of hf-High and hf-Medium may be empirical values determined according to a limited number of experiments, for example, may be selected from, but not limited to, {0.25, 0.5, 0.75, 1.0, 1.25, 1.5} listed above.

Preferably, since the unmanned aerial vehicle may be in high speed mobility at the same time, the measurement and report configuration related information for the unmanned aerial vehicle may further include mobility state parameters (MobilityStateParameters) and speed related scale factors (SpeedStateScaleFactors). It is assumed that there are two mobility states HighSpeedState and MediumSpeedState and two corresponding speed related scale factors sf-High and sf-Medium. For the unmanned aerial vehicle, there may be nine scenarios as shown in Table 2 below.

TABLE 2

Parameter Correction Based On Height State and Mobility State

| Height State | Speed State | | |
| --- | --- | --- | --- |
| | None | MediumSpeedState | HighSpeedState |
| None | None | sf-Medium | sf-High |
| MediumHeightState | hf-Medium | hf-Medium and sf-Medium | hf-Medium and sf-High |
| HighHeightState | hf-High | hf-High and sf-Medium | hf-High and sf-High |

The following description is given by taking the timeToTrigger in the above parameters as an example. After receiving the measurement and report configuration related information, the unmanned aerial vehicle determines the current height state and the current mobility state, and selects from height related scale factors and speed related scale factors defined above in Table 2, scale factors suitable for the current height state and the current mobility state to correct the value of the parameter timeToTrigger included in the measurement and report configuration related information. For example, it is assumed that the current height state is HighHeightState and the current mobility state is MediumSpeedState, the unmanned aerial vehicle may determine a value obtained by multiplying the value of the configured timeToTrigger by the factor hf-high and the factor sf-Medium, as a value of the duration for triggering the reporting.

The above description may be similarly applied to other parameters in the measurement and report configuration, for example, s-Measure, a1-Threshold, which are not enumerated herein.

Figure 15:
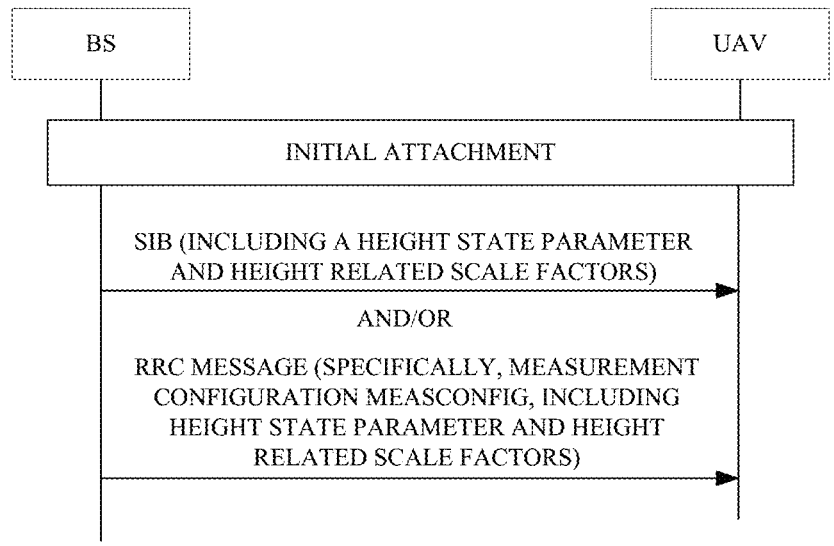
FIG. 15 is a flowchart schematically showing an example of configuring measurement and report configuration related information specific to an unmanned aerial vehicle by configuring a height state parameter and height related scale factors for a user equipment.

FIG. 15 schematically shows a flow of configuring measurement and report configuration related information specific to an unmanned aerial vehicle by configuring a height state parameter and height related scale factors for a user equipment.

As shown in FIG. 15, after the unmanned aerial vehicle UAV completes initial attachment to the base station BS, the base station BS may broadcast the height state parameter and the height related scale factors by a system message SIB. Alternatively, the height state parameter and the height related scale factors may be transmitted to the unmanned aerial vehicle by an RRC message (specifically, MeasConfig).

Alternatively, as another implementation example, the selection of the height related scale factor may also be performed at the base station side. Referring back to FIG. 12, the generating unit 1202 may be further configured to: determine a height state of the user equipment, determine a height related scale factor corresponding to each parameter in the measurement and report configuration according to the determined height state, and include the determined height related scale factor in the measurement and report configuration related information to be notified to the user equipment. Specifically, the apparatus at the base station side does not need to notify the height state parameter and the height related scale factors respectively corresponding to the height states to the user equipment. The apparatus at the base station side determines the height state of the user equipment according to the height information reported by the user equipment and notifies the height related scale factor suitable for the current height state to the user equipment, so that the user equipment can directly utilize the received height related scale factor to correct the related parameters. In this way, the processing load at the user equipment side can be reduced.

It should be noted that, the height related scale factors applied for the parameters in the measurement and report configuration may be the same as each other or different from each other.

Instead of or in combination with the configuring the measurement and report configuration related information specific to the unmanned aerial vehicle by applying a height related scale factor to the related parameters according to the height state, the measurement and report configuration related information generated by the generating unit 1202 may also be information in a form of a table in which preconfigured one or more sets of parameters are stored in association with height information. In this case, the user equipment may receive and store the information in the form of the table, select a set of parameters suitable for the current height state by looking up the table based on the current height, and perform a corresponding measurement and report operations according to the selected set of parameters.

Figure 16:
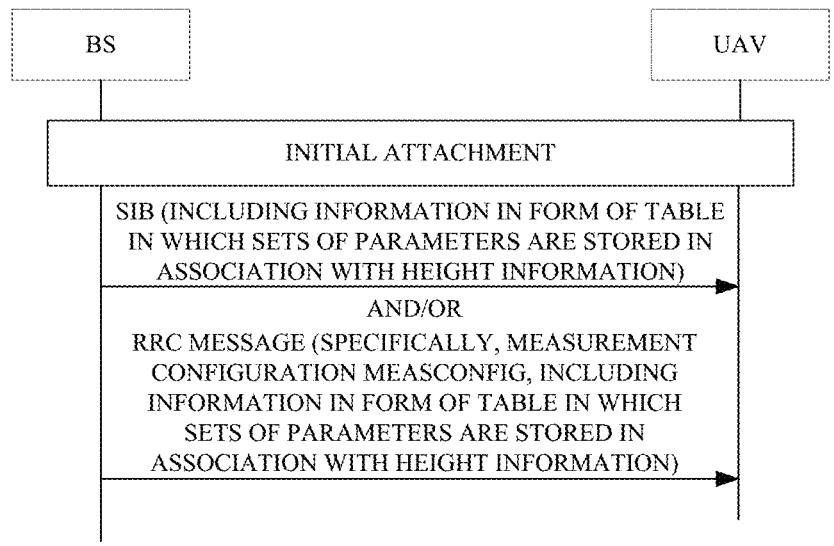
FIG. 16 is a flowchart schematically showing an example of configuring measurement and report configuration related information specific to an unmanned aerial vehicle by notifying preconfigured information in a form of a table to a user equipment.

FIG. 16 schematically shows a flow of configuring measurement and report configuration related information specific to an unmanned aerial vehicle by notifying preconfigured information in a form of a table to a user equipment.

As shown in FIG. 16, after an unmanned aerial vehicle UAV completes initial attachment to a base station BS, the base station BS may broadcast the information in the form of the table by a system message SIB. Alternatively, the information in the form of the table may be transmitted to the unmanned aerial vehicle by an RRC message (specifically, MeasConfig).

Alternatively, instead of or in combination with the above two manners, the generating unit 1202 may determine values of the parameters in the measurement and report configuration in real time according to the height information of the user equipment, and include the determined values in the measurement and report configuration related information to be notified to the user equipment. In this way, after receiving the measurement and report configuration related information, the user equipment directly performs a related measurement and report operations according to the parameter configuration in the measurement and report configuration related information, without perform any calculation.

In the case that the flight height of the unmanned aerial vehicle is high, since the LoS may exist between the unmanned aerial vehicle and multiple base stations, it may be measured that multiple cells have an RSRP/RSRQ value higher than the threshold. According to the conventional measurement and report configuration, the unmanned aerial vehicle may transmit measurement results of the cells to the serving base station. However, in the case that the unmanned aerial vehicle is flying high and fast, the cell with the largest RSRP/RSRQ may be not the best handover target cell. Therefore, in order to avoid the frequent handover and the handover failure and improve the handover accuracy so that the unmanned aerial vehicle can perform a handover to an optimal/preferred cell, the parameter trigger quantity (triggerQuantity) in the measurement and report configuration may be modified for the unmanned aerial vehicle, such that the trigger quantity further includes a variation rate of the RSRP and a variation rate of the RSRQ, in addition to the existing quantities RSRP and RSRQ.

For example, the parameter triggerQuantity may be defined as follows:

triggerQuantity ENUMERATED{rsrp,rsrq,rsrp+delta (rsrp),rsrq+delta(rsrq)} where delta(rsrp) represents the variation rate of the RSRP, and delta(rsrq) represents the variation rate of the RSRQ, which may be defined as a variation rate of the RSRP or RSRQ during a period from time at which the user equipment receives the measurement and report configuration related information to time at which the duration (TimeToTrigger) expires.

That is, the trigger quantity may be selected from one of the four quantities enumerated above: the reference signal reception power; the reference signal reception quality; the reference signal reception power and the variation rate of the reference signal reception power; and the reference signal reception quality and the variation rate of the reference signal reception quality.

Accordingly, the measurement and report configuration related information also needs to include a report condition for the variation rate of the reference signal reception power and/or the variation rate of the reference signal reception quality. For a certain cell, if the variation rate is positive, it is indicated that the unmanned aerial vehicle is flying to the cell. If the variation rate is negative, it is indicated that the unmanned aerial vehicle is flying away from the cell. In addition, if the variation rate is positive and large, it is indicated that the unmanned aerial vehicle is flying fast to the cell. If the variation rate is positive and small, it is indicated that the unmanned aerial vehicle is flying slow to the cell. Therefore, preferably, the reporting trigger condition for the variation rate may be defined as triggering the reporting if the variation rate is greater than or equal to a predetermined threshold. The predetermined threshold may be 0 or may be an empirical value determined according to a limited number of experiments, which is not limited herein.

In addition, the parameter report quantity (reportQuantity) may also be modified similarly, so that the base station, when performing, for example, a handover decision, not only considers the RSRP and/or RSRQ values of the cells as in the conventional technology, but also considers the variation rate of the RSRP and/or RSRQ to select a better target handover cell.

For example, the parameter reportQuantity may be defined as follows:

reportQuantity
ENUMERATED{sameAsTriggerQuantity,All}

That is, the report quantity may be the same as the trigger quantity or include all the quantities enumerated above. In other words, the report quantity includes one or more of the following: the reference signal reception power; the reference signal reception quality; the variation rate of the reference signal reception power; and the variation rate of the reference signal reception quality.

It can be understood from to the above definitions of the trigger quantity and the report quantity that, the variation rate may only be used as a condition for determining whether to trigger the reporting. For example, the measurement result of only the cell of which the variation rate is positive and the RSRP/RSRQ is greater than the predetermined threshold is reported. Alternatively, the variation rate may be reported as a measurement result to the base station along with the RSRP/RSRQ, in order for the base station to make, for example, a handover decision.

Optionally, the apparatus 1200 according to this embodiment may further include a candidate cell determining unit 1206 and a target cell determining unit 1208 (which is optional and is shown by a dashed box). The candidate cell determining unit 1206 may be configured to determine candidate target cells from measured cells according to the reference signal reception power and/or the reference signal reception quality reported by the user equipment. For example, the candidate cell determining unit 1206 may determine measured cells of which the RSRQs/RSRPs are higher than a predetermined threshold as the candidate target cells.

The target cell determining unit 1208 may be configured to determine a handover target cell from the candidate target cells according to the variation rate of the reference signal reception power and/or the variation rate of the reference signal reception quality. For example, the target cell determining unit 1208 may determine one of the candidate target cells of which the variation rate of the reference signal reception power and/or the variation rate of the reference signal reception quality is positive and the maximum as a final handover target cell.

Figure 17:
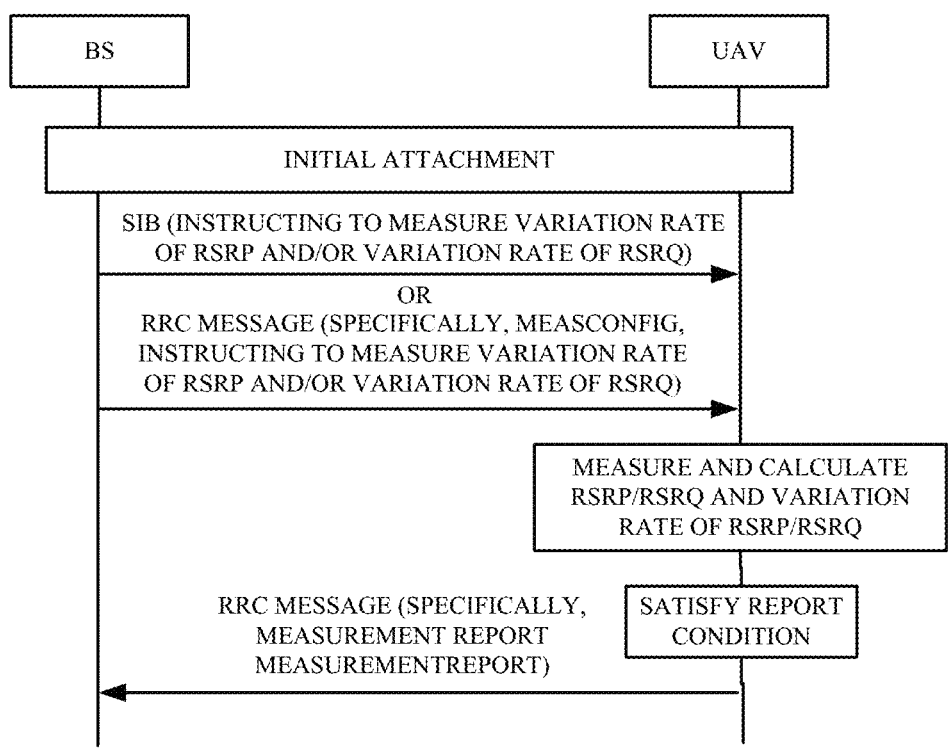
FIG. 17 is a flowchart schematically showing an example flow of configuration, measurement and reporting of a variation rate of RSRP/RSRQ.

FIG. 17 schematically shows an example flow of configuration, measurement, and reporting of a variation rate of RSRP/RSRQ.

As shown in FIG. 17, after the unmanned aerial vehicle UAV completes initial attachment to the base station BS, the base station may configure the unmanned aerial vehicle UAV to measure the variation rate of the RSRP and/or the variation rate of the RSRQ by a system message SIB or an RRC message (specifically, measurement configuration MeasConfig). After completing the measurement and calculation for the RSRP/RSRQ and the variation rate of the RSRP/RSRQ, the unmanned aerial vehicle UAV determines whether the reporting trigger condition is satisfied according to related configuration of the trigger quantity and the report quantity in the measurement and report configuration related information from the base station, and reports the corresponding measurement results to the base station by, for example, an RRC message (specifically, Measurement Report).

As described in the first embodiment, since the range of measured cells for the unmanned aerial vehicle may be expanded from the adjacent cells to a farther range, the number of cells satisfying the report condition may be larger than the number of report cells of a conventional UE on the ground. Preferably, the maximum number of report cells "maxReportCells" in the generated measurement and report configuration related information may be set to an integer between 1 and a predetermined threshold. The predetermined threshold may be larger than or equal to 8.

In addition, as the range of measured cells for the unmanned aerial vehicle is expanded, if the reporting is still performed according to the current condition (the reporting is triggered in a case that any cell satisfies the report condition), a large number of resources are used for the reporting, which may affect normal communication of the unmanned aerial vehicle. Therefore, in order to avoid excessive measurement and reporting overhead, the measurement and report configuration related information generated by the generating unit 1202 may preferably further include the following reporting trigger condition: information indicating a cell number threshold for which a report condition is satisfied to trigger reporting. That is, only if the number of cells satisfying the report condition is greater than or equal to the predetermined threshold, the user equipment is triggered to report measurement results of all the cells to the base station together.

The information indicating the cell number threshold may be a proportion of cells satisfying a report condition to measured cells or may be the number of cells satisfying a report condition.

Specifically, for example, a proportion may be configured. If a proportion of cells satisfying a report condition to measured cells exceeds the proportion, the reporting of the measurement result is triggered. The proportion may be expressed in one or more bits. As an example, bits of 00 may indicate a proportion value of ½, bits of 01 may indicate a proportion value of ⅓, bits of 10 may indicate a proportion value of ¼, and bits of 11 may indicate a proportion value of ⅕.

In addition, a cell number threshold M may be configured. It is assumed that the number of the measured cells is N. Only if there are M cells satisfying the report condition, the user equipment is triggered to report the measurement results of the M cells to the base station together.

The above proportion value or the value M may be an empirical value determined according to a limited number of experiments, or may be dynamically configured by the base station according to the height information of the user equipment, which is not limited in the present disclosure.

Figure 18:
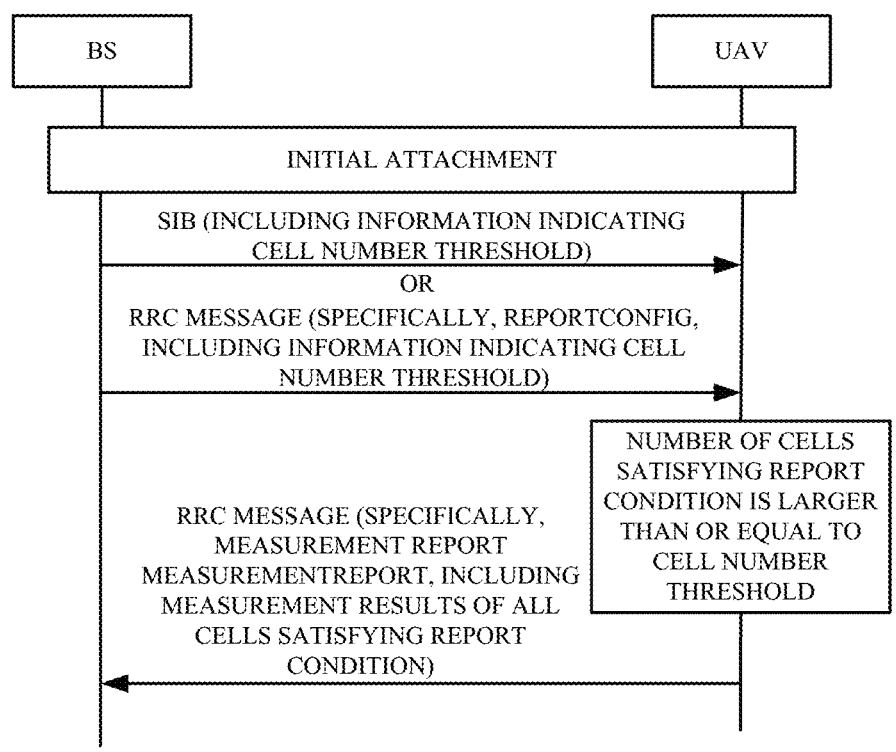
FIG. 18 is a flowchart schematically showing an example of a flow of configuration and reporting of information indicating a cell number threshold.

FIG. 18 schematically shows a flow of configuration and reporting of the above information indicating the cell number threshold.

As shown in FIG. 18, after the unmanned aerial vehicle UAV completes initial attachment to the base station BS, the base station may broadcast the information indicating the cell number threshold by a system message SIB. Alternatively, the information indicating the cell number threshold may be transmitted to the unmanned aerial vehicle by an RRC message (specifically, ReportConfig).

It should be noted that the various functional units described above with reference to FIG. 12 are merely logical modules that are divided according to implemented specific functions, and are not intended to limit the specific implementation. In the actual implementation, the functional units and modules described above may be implemented as separate physical entities or may be implemented by a single entity (e.g., a processor (for example, CPU or DSP), or an integrated circuit).

In addition, it should be noted that the apparatus 1200 described above with reference to FIG. 12 may be implemented at the chip level, or may also be implemented at the device level by including other external components. For example, the apparatus 1200 may operate as a base station itself, and may include a communication unit (which is optional and is shown by a dashed box) for performing communication operations. For example, the communication unit may be used to perform a communication with other base stations, the core network, the user equipment, and the like. In addition, it should further be noted that the specific implementation form of the communication unit is not limited herein. The communication unit may include one or more communication interfaces to achieve communication with different external devices.

[2-2. Configuration Example of Apparatus at User Equipment Side]

Corresponding to the embodiment of the apparatus at the base station side described above, an embodiment of an apparatus at a user equipment side is described below.

Figure 19:
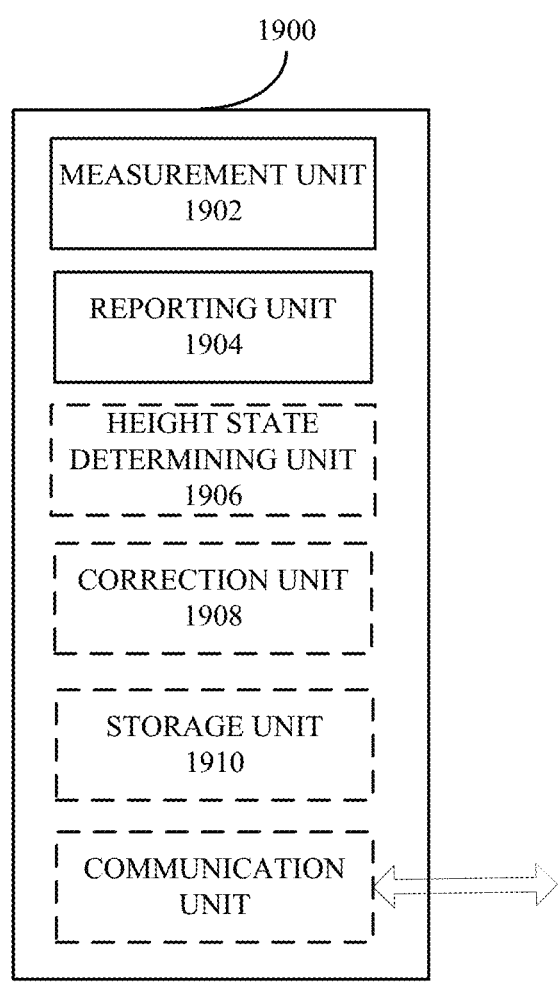
FIG. 19 is a block diagram showing a functional configuration example of an apparatus at a user equipment side in a wireless communication system according to the second embodiment of the present disclosure.

FIG. 19 is a block diagram showing a functional configuration example of an apparatus at a user equipment side in a wireless communication system according to the second embodiment of the present disclosure.

As shown in FIG. 19, an apparatus 1900 according to this embodiment may include a measurement unit 1902 and a reporting unit 1904.

The measurement unit 1902 may be configured to perform a measurement according to measurement and report configuration related information from a base station. The measurement and report configuration related information is related to at least height information of a user equipment.

Specifically, the measurement and report configuration related information includes, but is not limited to, at least information related to one or more of the following parameters: a serving cell quality threshold, a threshold satisfying a report condition, a hysteresis parameter, a duration during which a report condition is satisfied to trigger reporting, a maximum number of report cells, a trigger quantity, a report quantity and a report interval.

The reporting unit 1904 may be configured to report a measurement result to the base station. Preferably, the reporting unit 1904 may report the measurement result to the base station by an RRC message (specifically, MeasurementReport). Alternatively, in order to improve the reporting speed, a MAC CE may be newly defined to be dedicated to the measurement and reporting of the unmanned aerial vehicle. In addition, alternatively, in a scenario that the flight speed of the unmanned aerial vehicle is fast and the real time requirement is high, the measurement result may be reported by physical layer signaling (for example, UCI).

In a case that the measurement and report configuration related information from the base station further includes the height state parameter and one or more height related scale factors corresponding to one or more height states, the apparatus 1900 at the user equipment side is required to utilize an appropriate height related scale factor according to the height state thereof to correct the parameters included in the measurement and report configuration related information, to be applied to the measurement and reporting operations thereof.

Accordingly, the apparatus 1900 may preferably further include a height state determining unit 1906 and a correction unit 1908 (which are optional and are shown by dashed boxes).

The height state determining unit 1906 may be configured to determine a height state of the user equipment according to the height state parameter. The correction unit 1908 may be configured to select a height related scale factor corresponding to the determined height state from the one or more height related scale factors, and utilize the selected height related scale factor to correct the related parameters.

In addition, as described above, the determination of the height state and the selection of the height related scale factor may also be performed at the base station side, so that the measurement and report configuration related information from the base station may include only the height related scale factor corresponding to the current state the user equipment. In this case, the height state determining unit 1906 may be omitted, and the correction unit 1908 may be configured to directly utilize the height related scale factor notified by the base station to correct the parameters.

It should be noted that the height related scale factors corresponding to the parameters may be the same as each other or different from each other.

The detailed description for the height state parameter and the height related scale factor may refer to the corresponding description in the embodiment of the base station side described above, which is not repeated herein.

Preferably, the correction unit 1908 may be further configured to select an appropriate speed related scale factor further according to the flight speed of the user equipment, and utilize the selected speed related scale factor in combination with the height related scale factor to correct the parameters.

Preferably, the measurement and report configuration related information from the base station may further include information in a form of a table in which preconfigured one or more sets of parameters are stored in association with height information. In this case, preferably, the apparatus 1900 may further include a storage unit 1910 (which is optional and is shown by a dashed box). The storage unit 1910 may be configured to store the information in the form of the table. The measurement unit 1902 and the reporting unit 1904 may be further configured to read the information in the form of the table from the storage unit, select one set of parameters corresponding to a current height state of the user equipment, and perform a corresponding measurement and reporting operations according to the set of parameters.

Further, preferably, the measurement unit 1902 may be further configured to measure a variation rate of the reference signal reception power and/or a variation rate of the reference signal reception quality according to the measurement and report configuration related information from the base station.

The variation rate of the reference signal reception power and/or the variation rate of the reference signal reception quality may be used as a condition for determine whether to trigger the reporting. In this case, the reporting unit 1904 may be further configured to: determine whether the variation rate of the reference signal reception power satisfies a report condition if it is determined that the reference signal reception power satisfies a report condition, or determine whether the variation rate of the reference signal reception quality satisfies a report condition if it is determined that the reference signal reception quality satisfies a report condition, according to information related to the trigger quantity; and report a measurement result to the base station if it is determined that the variation rate of the reference signal reception power satisfies the report condition or the variation rate of the reference signal reception quality satisfies the report condition.

Alternatively, the variation rate of the reference signal reception power and/or the variation rate of the reference signal reception quality may be reported only as a measurement result to the base station in order for the base station to perform a relevant decision. In this case, the reporting unit 1904 may be further configured to: report one or more of the reference signal reception power, the variation rate of the reference signal reception power, the reference signal reception quality and the variation rate of the reception signal reception quality to the base station, according to information related to the report quantity.

Preferably, the reporting unit 1904 may report the measurement result (including the RSRP and the variation rate of the RSRP, and/or the RSRQ and the variation rate of the RSRQ) of the cell of which the RSRP/RSRQ value satisfies the report condition to the base station, or may report the measurement result of the cell of which the RSRP/RSRQ value and the variation rate of the RSRP/RSRQ satisfy the report condition to the base station.

The specific configuration of the trigger quantity and the report quantity, and the specific description of the variation rate of the reference signal reception power and the variation rate of the reference signal reception quality may refer to the corresponding description in the embodiment of the base station side described above, which is repeated herein.

As described above, in order to reduce the measurement and report overhead, the measurement and report configuration related information may further include information indicating a cell number threshold for which a report condition is satisfied to trigger reporting. In this way, only if the number of cells satisfying the report condition reaches a certain number, the user equipment is triggered to report measurement results of all the cells to the base station together. Therefore, the reporting unit 1904 may be preferably further configured to report, if it is determined that the number of cells satisfying a report condition is larger than or equal to the cell number threshold, measurement results of all the cells satisfying the report condition to the base station.

It should be noted that the embodiment of the apparatus at the user equipment side described herein corresponds to the embodiment of the apparatus at the base station side described above. The content that is not described in detail herein may refer to the corresponding description above, which is not repeated herein.

It should further be noted that the apparatus 1900 described above with reference to FIG. 19 may be implemented at the chip level, or may also be implemented at the device level by including other external components. For example, the apparatus 1900 may operate as a user equipment itself, and may include a communication unit (which is optional and is shown by a dashed box) for performing communication operations. For example, the communication unit may be used to perform a communication with the base station, other user equipments, and the like. In addition, it should further be noted that the specific implementation form of the communication unit is not limited herein. The communication unit may include one or more communication interfaces to achieve communication with different external devices.

In addition, it should be noted that although the apparatus embodiments (including the apparatus at the base station side and the apparatus at the user equipment side) of the present disclosure have been described above with reference to the drawings, the described embodiments are merely exemplary but not limitative. Those skilled in the art may make modifications on illustrated functional configuration examples according to the principle of the present disclosure, for example, add, delete, change, or combine the functional modules, and all such variations should be considered to fall within the scope of the present disclosure.

[2-3. Method Example]

Corresponding to the above apparatus embodiments, the following method embodiments are further provided in the present disclosure. A method in a wireless communication system according to the second embodiment of the present disclosure is described below with reference to FIGS. 20 and 21.

Figure 20:
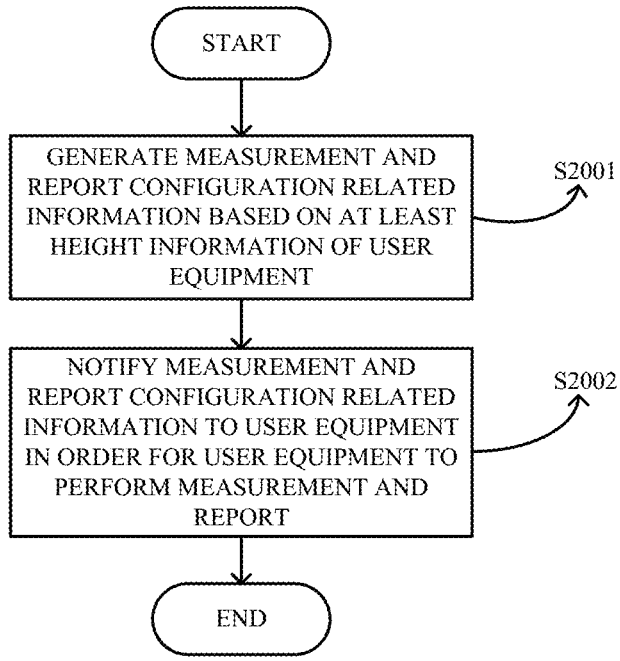
FIG. 20 is a flowchart showing a process example of a method at a base station side in a wireless communication system according to the second embodiment of the present disclosure.

FIG. 20 is a flowchart showing a process example of a method at a base station side in a wireless communication system according to the second embodiment of the present disclosure.

As shown in FIG. 20, the method according to this embodiment starts at step S2001. In step S2001, measurement and report configuration related information is generated based on at least height information of a user equipment. The measurement and report configuration related information includes at least configuration specific to an unmanned aerial vehicle, and may further include configuration suitable for a conventional UE on the ground.

Then, the method proceeds to step S2002. In step S2002, the generated measurement and report configuration related information is notified to the user equipment in order for the user equipment to perform a measurement and report. Preferably, the measurement and report configuration related information may be notified to the user equipment by one or more of a system message (SIB) and an RRC message (specifically, measurement configuration (MeasConfig) and report configuration (ReportConfig)).

Preferably, the measurement and report configuration related information may include, but is not limited to, information related to one or more of the following parameters: a serving cell quality threshold, a threshold satisfying a report condition, a hysteresis parameter, a duration during which a report condition is satisfied to trigger reporting, a maximum number of report cells, a trigger quantity, a report quantity and a report interval. Preferably, the measurement and report configuration related information may further include a height state parameter for determining one or more height states and one or more height related scale factors corresponding to the one or more height states, in order for the user equipment to perform a selection and utilize an scale factor suitable for the current height to correct related parameters. Alternatively, the measurement and report configuration related information may include only a height related scale factor corresponding to the current height state of the user equipment.

Further, preferably, the measurement and report configuration related information may include information in a form of a table in which preconfigured one or more sets of parameters are stored in association with height information. Alternatively, the measurement and report configuration related information may further include values of the parameters in determined in real time by the base station according to the height information of the user equipment.

Preferably, the maximum number of report cells may be greater than or equal to 8. Further, preferably, the report quantity and/or the trigger quantity may further include a variation rate of the RSRP and/or RSRQ, in addition to the existing RSRP and/or RSRQ, which improves the accuracy for the decision operation, so as to select the optimal handover target cell.

It should be noted that the method embodiment herein corresponds to the embodiment of the apparatus at the base station side described above. The content that is not described in detail herein may refer to the corresponding description above, which is not repeated herein.

Figure 21:
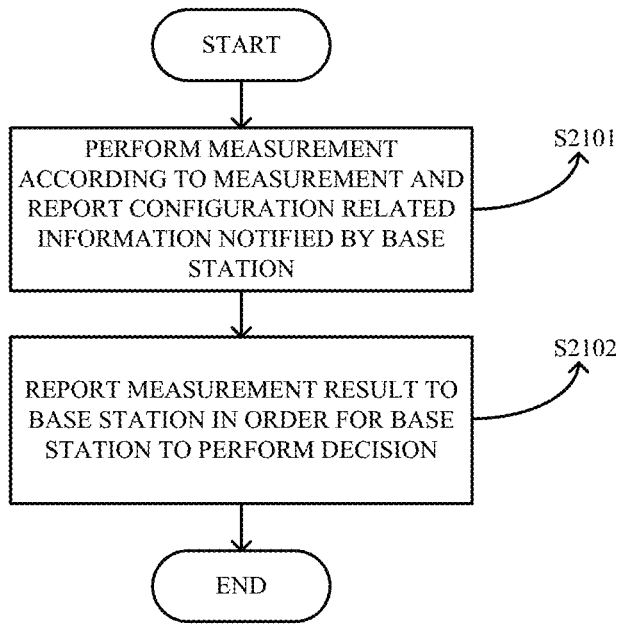
FIG. 21 is a flowchart showing a process example of a method at a user equipment side in a wireless communication system according to the second embodiment of the present disclosure.

FIG. 21 is a flowchart showing a process example of a method at a user equipment side in a wireless communication system according to the second embodiment of the present disclosure.

As shown in FIG. 21, the method according to this embodiment starts at step S2101. In step S2101, a measurement is performed according to measurement and report configuration related information from a base station. The measurement and report configuration related information may include, but is not limited to, information related to one or more of the following parameters: a serving cell quality threshold, a threshold satisfying a report condition, a hysteresis parameter, a duration during which a report condition is satisfied to trigger reporting, a maximum number of report cells, a trigger quantity, a report quantity and a report interval.

Then, the method proceeds to step S2102. In step S2102, a measurement result is reported to the base station. Preferably, the measurement result may be carried by one or more of an RRC message (specifically, MeasurementReport), an MAC CE, and physical layer signaling (e.g., UCI) to balance the reporting speed and reasonable configuration of communication resources.

Preferably, in a case that the measurement and report configuration related information further includes a height state parameter for determining one or more height states and one or more height related scale factors corresponding to the one or more height states, the method may further include: determining a height state of the user equipment according to the height state parameter; and selecting a height state scale factor corresponding to the current height state from the one or more height related scale factors, and utilizing the scale factor to correct the parameters in the measurement and report configuration related information.

Preferably, in a case that the measurement and report configuration related information includes only a height related scale factor corresponding to the current height state of the user equipment, the method may further include: utilizing the scale factor to correct the parameters in the measurement and report configuration related information, for the measurement and report operations.

Preferably, in a case that the measurement and report configuration related information includes information in a form of a table in which preconfigured one or more sets of parameters are stored in association with height information, the method may further include: selecting one set of parameters corresponding to the current height state of the user equipment according to the information in the form of the table, and performing a measurement according to the selected one set of parameters.

Preferably, in the measuring step S2101, a variation rate of a reference signal reception power and/or a variation rate of a reference signal reception quality are measured according to the measurement and report configuration related information from the base station. The variation rate of the reference signal reception power and/or the variation rate of the reference signal reception quality may be used as a trigger quantity for determining whether a report condition is satisfied, and/or may be reported as a measurement result to the base station in order for the base station to perform a relevant decision.

Preferably, the method may further include: determining whether the variation rate of the reference signal reception power satisfies a report condition if it is determined that the reference signal reception power satisfies a report condition, or determining whether the variation rate of the reference signal reception quality satisfies a report condition if it is determined that the reference signal reception quality satisfies a report condition; and reporting a measurement result to the base station if it is determined that the variation rate of the reference signal reception power satisfies the report condition or the variation rate of the reference signal reception quality satisfies the report condition.

Further, preferably, the method may further include: reporting one or more of the reference signal reception power, the variation rate of the reference signal reception power, the reference signal reception quality and the variation rate of the reception signal reception quality to the base station.

Preferably, in a case that the measurement and report configuration related information further includes the information indicating a cell number threshold for which a report condition is satisfied to trigger reporting, the method may further include: reporting, if it is determined that the number of cells satisfying a report condition is larger than or equal to the cell number threshold, measurement results of all the cells satisfying the report condition to the base station. In this way, excessive measurement and report overhead can be avoided.

It should be noted that the method embodiment herein corresponds to the embodiment of the apparatus at the user equipment side described above. The content that is not described in detail herein may refer to the corresponding description above, which is not repeated herein.

In addition, it should be understood that the flowcharts shown in FIG. 20 and FIG. 21 merely exemplary but not limitative. Those skilled in the art may make modifications on illustrated processing flow examples according to the principle of the present disclosure, for example, add, delete, change, or combine the steps, and all such variations should be considered to fall within the scope of the present disclosure.

According to the second embodiment of the present disclosure described above, for the feature that the flight height of the unmanned aerial vehicle is much larger than that of the conventional UE on the ground, the measurement and report configuration related information specific to the unmanned aerial vehicle is configured. More specifically, each parameter in the measurement and report configuration related information is reasonably set based on at least the flight height of the unmanned aerial vehicle to improve, for example, the accuracy of the handover operation. Further, by adding new parameters such as the variation rate of the RSRP/RSRQ, the height state parameter, the height related scale factors, and the cell number threshold for which a report condition is satisfied to trigger reporting in the measurement and report configuration related information, the following beneficial technical effects can be achieved, for example, an optimal/better handover target cell can be selected, and the measurement and report overhead can be reduced.

It should be noted that, although the first embodiment and the second embodiment of the present disclosure have been separately described above for ease of understanding, this does not mean that the various embodiments are completely independent or mutually exclusive. In fact, those skilled in the art may make appropriate combinations or modifications on the above-described embodiments in accordance with the principle of the present disclosure, and such combinations or modifications are also considered to fall within the scope of the present disclosure.

It should be understood that the machine-executable instructions in the storage medium and the program product according to the embodiments of the present disclosure may further be configured to perform the method corresponding to the apparatus embodiment described above, and thus the content not described in detail herein may refer to the description of the previous corresponding position, which is not repeated herein.

Accordingly, a storage medium for carrying the above-described program product including machine-executable instructions is also included in the present disclosure. The storage medium includes, but is not limited to, a floppy disk, an optical disk, a magneto-optical disk, a memory card, a memory stick, and the like.

[3. Computing Device for Implementing Embodiments of Apparatus and Method of Present Disclosure]

Figure 22:
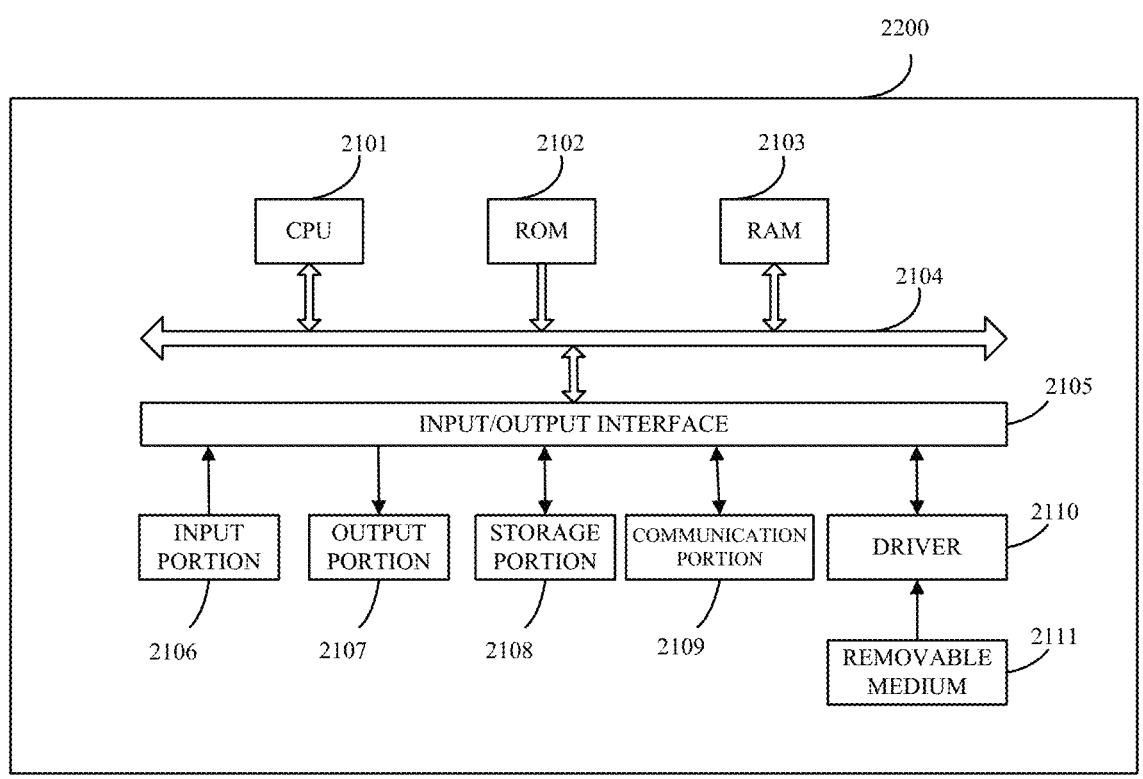
FIG. 22 is a block diagram showing an example structure of a personal computer as an information processing apparatus that can be employed in an embodiment of the present disclosure.

In addition, it should further be noted that the above series of processes and devices can also be implemented by software and/or firmware. In the case of implementing by software and/or firmware, a program constituting the software may be installed from a storage medium or a network to a computer having a dedicated hardware structure, for example, a general-purpose personal computer 2100 shown in FIG. 22. The computer can perform various functions when being installed with various programs. FIG. 22 is a block diagram showing an example structure of a personal computer as an information processing apparatus that can be employed in an embodiment of the present disclosure.

In FIG. 22, a central processing unit (CPU) 2101 performs various types of processing according to programs stored in a read only memory (ROM) 2102 or programs loaded from a storage portion 2108 to a random access memory (RAM) 2103. Data required when the CPU 2101 performs various types of processing is stored in the RAM 2103 as needed.

The CPU 2101, the ROM 2102 and the RAM 2103 are connected to each other via a bus 2104. An input/output interface 2105 is also connected to the bus 2104.

The following components are connected to the input/output interface 2105: an input portion 2106 including a keyboard, a mouse, or the like; an output portion 2107 including a display such as a cathode ray tube (CRT) and a liquid crystal display (LCD), a speaker, or the like; a storage portion 2108 including a hard disk, or the like; and a communication portion 2109 including a network interface card such as a LAN card, a modem, or the like. The communication portion 2109 performs communication processing via a network such as the Internet.

A driver 2110 may also be connected to the input/output interface 2105 as needed. A removable medium 2111 such as a magnetic disk, an optical disk, a magneto-optical disk and a semiconductor memory may be installed on the driver 2110 as needed, so that the computer programs read from the removable medium 2111 are installed in the storage portion 2108 as needed.

In a case that the series of processing described above is implemented by software, programs constituting the software are installed from a network such as the Internet or a storage medium such as the removable medium 2111.

Those skilled in the art should understand that the storage medium is not limited to the removable medium 2111 shown in FIG. 22 that stores programs and is distributed separately from the device to provide the programs to the user. Examples of the removable medium 2111 include: a magnetic disk (including a floppy disk (registered trademark)), an optical disk (including a compact disk read only memory (CD-ROM) and a digital versatile disk (DVD)), a magneto-optical disk (including a mini-disk (MD) (registered trademark)) and a semiconductor memory. Alternatively, the storage medium may be the ROM 2102, a hard disk included in the storage portion 2108 or the like. The programs are stored in the storage medium, and the storage medium is distributed to the user together with the device including the storage medium.

<Application Example of Technology of Present Disclosure>

The technology of the present disclosure can be applied to various products. For example, the base station mentioned in the present disclosure may be implemented as any type of evolution Node B (eNB), such as a macro eNB and a small eNB. The small eNB may be an eNB covering a cell smaller than a macro cell, such as a pico eNB, a micro eNB and a home (femto) eNB. Alternatively, the base station may be implemented as any other type of base station, such as a NodeB and a base transceiver station (BTS). The base station may include: a main body (also referred to as a base station device) configured to control wireless communication; and one or more remote radio heads (RRHs) arranged at positions different from the main body. In addition, various types of terminals described below may operate as a base station by performing functions of the base station temporarily or in a semi-persistent manner.

For example, the user equipment mentioned in the present disclosure may be implemented as a terminal device such as an unmanned aerial vehicle or a smart phone carried by an unmanned aerial vehicle. Further, the user equipment may be a wireless communication module (such as an integrated circuit module including a single wafer) installed on each of the above terminals.

Application examples according to the present disclosure are described below with reference to FIGS. 23 to 25.

4-1. Application Example on Base Station

First Application Example

Figure 23:
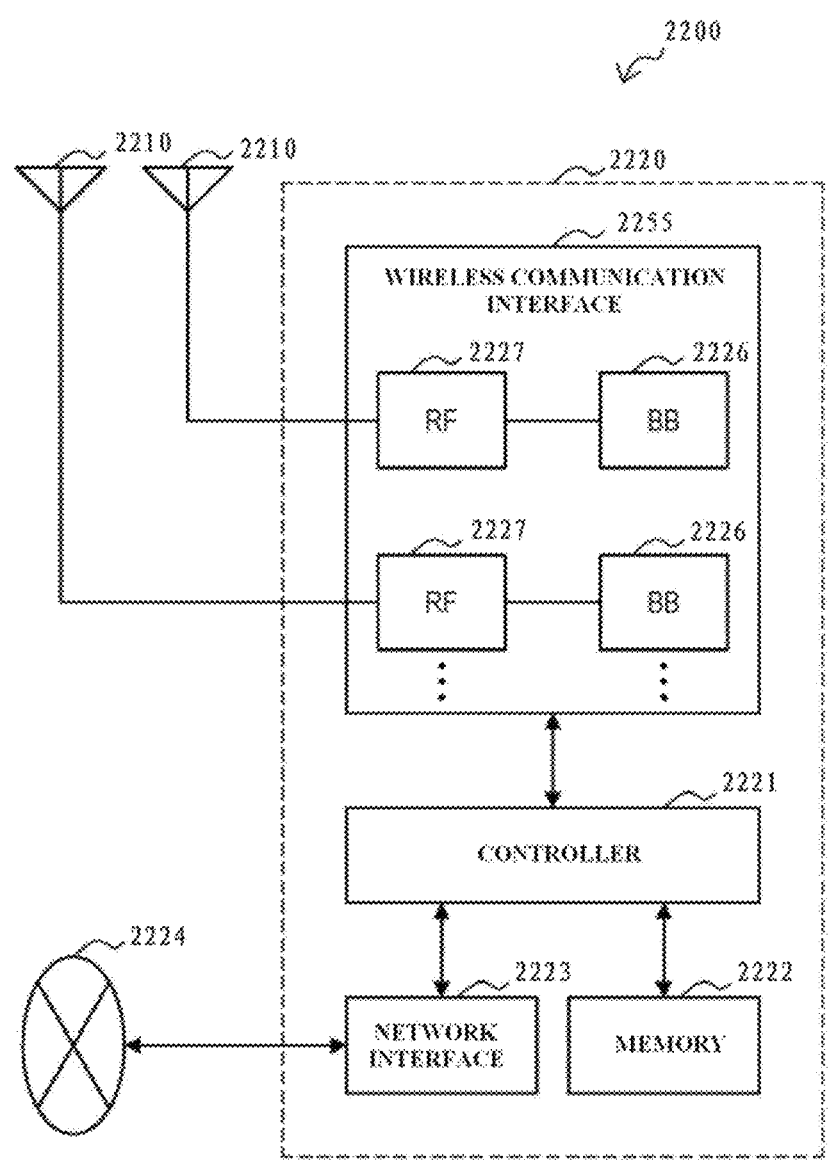
FIG. 23 is a block diagram showing a first schematic configuration example of an evolved node (eNB) to which the technology of the present disclosure may be applied.

FIG. 23 is a block diagram showing a first schematic configuration example of an eNB to which the technology of the present disclosure may be applied. An eNB 2200 includes one or more antennas 2210 and a base station device 2220. The base station device 2220 and each antenna 2210 may be connected to each other via an RF cable.

Each of the antennas 2210 includes a single or multiple antenna elements (such as multiple antenna elements included in a multi-input multi-output (MIMO) antenna), and is used for the base station device 2220 to transmit and receive wireless signals. As shown in FIG. 23, the eNB 2200 may include multiple antennas 2210. For example, the multiple antennas 2210 may be compatible with multiple frequency bands used by the eNB 2200. Although FIG. 23 shows the example in which the eNB 2200 includes the multiple antennas 2210, the eNB 2200 may also include a single antenna 2210.

The base station device 2220 includes a controller 2221, a memory 2222, a network interface 2223, and a wireless communication interface 2225.

The controller 2221 may be, for example, a CPU or a DSP, and operates various functions of a higher layer of the base station device 2220. For example, the controller 2221 generates a data packet from data in signals processed by the wireless communication interface 2225, and transfers the generated packet via the network interface 2223. The controller 2221 may bundle data from multiple baseband processors to generate the bundled packet, and transfer the generated bundled packet. The controller 2221 may have logical functions of performing a control such as radio resource control, radio bearer control, mobility management, admission control and scheduling. The control may be performed in corporation with an eNB or a core network node in the vicinity. The memory 2222 includes a RAM and a ROM, and stores a program executed by the controller 2221, and various types of control data (such as a terminal list, transmission power data, and scheduling data).

The network interface 2223 is a communication interface for connecting the base station device 2220 to a core network 2224. The controller 2221 may communicate with a core network node or another eNB via the network interface 2223. In this case, the eNB 2200, and the core network node or the other eNB may be connected to each other via a logical interface (such as an S1 interface and an X2 interface). The network interface 2223 may also be a wired communication interface or a wireless communication interface for wireless backhaul. If the network interface 2223 is a wireless communication interface, the network interface 2223 may use a higher frequency band for wireless communication than a frequency band used by the wireless communication interface 2225.

The wireless communication interface 2225 supports any cellular communication scheme (such as Long Term Evolution (LTE) and LTE-Advanced), and provides wireless connection to a terminal positioned in a cell of the eNB 2200 via the antenna 2210. The wireless communication interface 2225 may typically include, for example, a baseband (BB) processor 2226 and an RF circuit 2227. The BB processor 2226 may perform, for example, encoding/decoding, modulating/demodulating, and multiplexing/demultiplexing, and performs various types of signal processing of layers (such as L1, medium access control (MAC), wireless link control (RLC), and a packet data convergence protocol (PDCP)). The BB processor 2226 may have a part or all of the above-described logical functions instead of the controller 2221. The BB processor 2226 may be a memory that stores a communication control program, or a module that includes a processor and a related circuit configured to execute the program. Updating the program may allow the functions of the BB processor 2226 to be changed. The module may be a card or a blade that is inserted into a slot of the base station device 2220. Alternatively, the module may also be a chip that is mounted on the card or the blade. Meanwhile, the RF circuit 2227 may include, for example, a mixer, a filter, and an amplifier, and transmits and receives wireless signals via the antenna 2210.

As shown in FIG. 23, the wireless communication interface 2225 may include multiple BB processors 2226. For example, the multiple BB processors 2226 may be compatible with multiple frequency bands used by the eNB 2200. As shown in FIG. 23, the wireless communication interface 2225 may include multiple RF circuits 2227. For example, the multiple RF circuits 2227 may be compatible with multiple antenna elements. Although FIG. 23 shows the example in which the wireless communication interface 2225 includes the multiple BB processors 2226 and the multiple RF circuits 2227, the wireless communication interface 2225 may also include a single BB processor 2226 or a single RF circuit 2227.

Second Application Example

Figure 24:
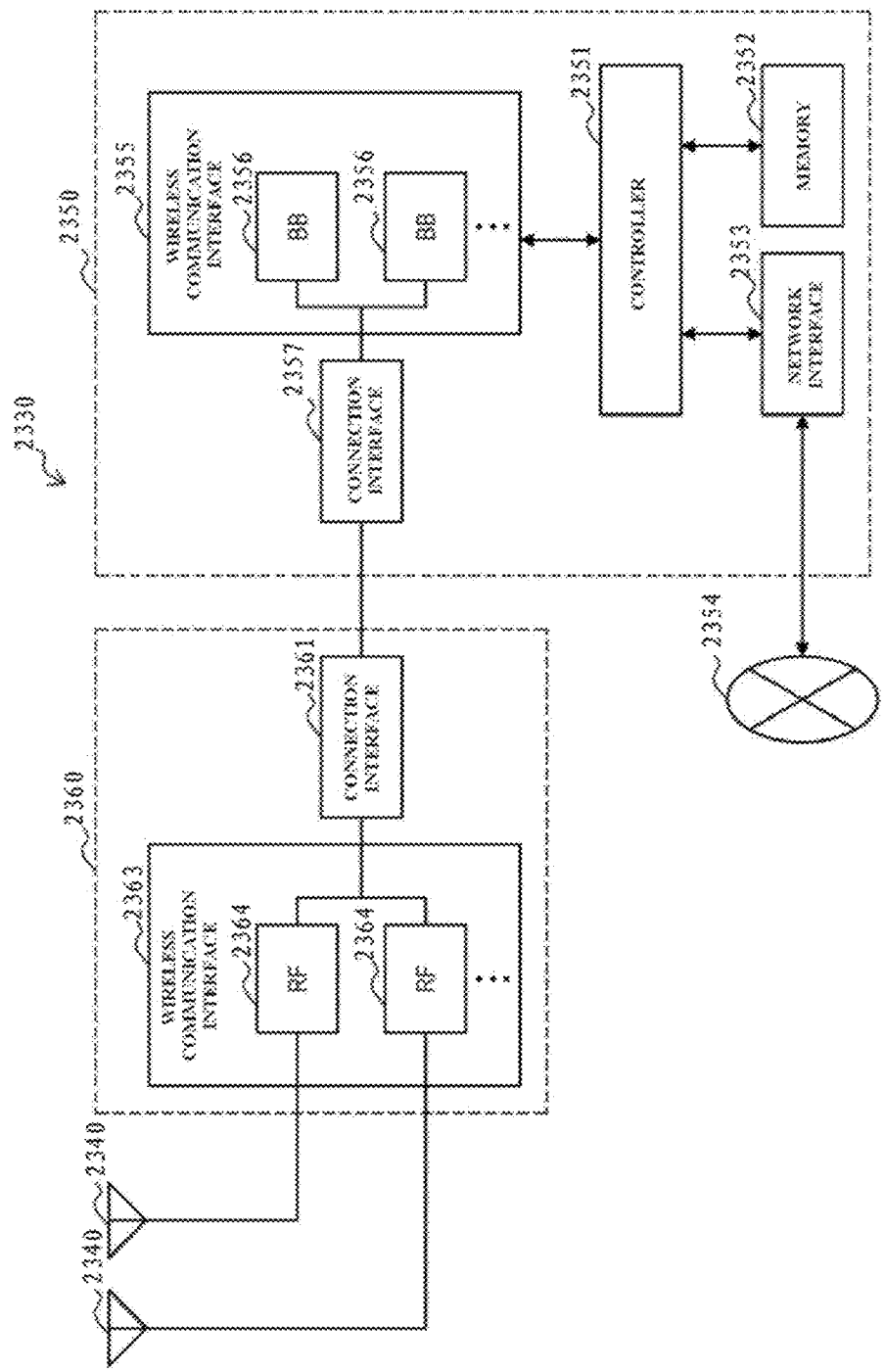
FIG. 24 is a block diagram showing a second schematic configuration example of an eNB to which the technology of the present disclosure may be applied.

FIG. 24 is a block diagram showing a second schematic configuration example of an eNB to which the technology of the present disclosure may be applied. An eNB 2330 includes one or more antennas 2340, a base station device 2350, and an RRH 2360. The RRH 2360 and each antenna 2340 may be connected to each other via an RF cable. The base station device 2350 and the RRH 2360 may be connected to each other via a high speed line such as an optical fiber cable.

Each of the antennas 2340 includes a single or multiple antenna elements (such as multiple antenna elements included in an MIMO antenna), and is used for the RRH 2360 to transmit and receive wireless signals. As shown in FIG. 24, the eNB 2330 may include multiple antennas 2340. For example, the multiple antennas 2340 may be compatible with multiple frequency bands used by the eNB 2330. Although FIG. 24 shows the example in which the eNB 2330 includes the multiple antennas 2340, the eNB 2330 may also include a single antenna 2340.

The base station device 2350 includes a controller 2351, a memory 2352, a network interface 2353, a wireless communication interface 2355, and a connection interface 2357. The controller 2351, the memory 2352, and the network interface 2353 are the same as the controller 2221, the memory 2222, and the network interface 2223 described with reference to FIG. 23.

The wireless communication interface 2355 supports any cellular communication scheme (such as LTE and LTE-Advanced), and provides wireless communication to a terminal positioned in a sector corresponding to the RRH 2360 via the RRH 2360 and the antenna 2340. The wireless communication interface 2355 may typically include, for example, a BB processor 2356. The BB processor 2356 is the same as the BB processor 2226 described with reference to FIG. 23, except the BB processor 2356 is connected to an RF circuit 2364 of the RRH 2360 via the connection interface 2357. As shown in FIG. 24, the wireless communication interface 2355 may include multiple BB processors 2356. For example, the multiple BB processors 2356 may be compatible with multiple frequency bands used by the eNB 2330. Although FIG. 24 shows the example in which the wireless communication interface 2355 includes the multiple BB processors 2356, the wireless communication interface 2355 may also include a single BB processor 2356.

The connection interface 2357 is an interface for connecting the base station device 2350 (wireless communication interface 2355) to the RRH 2360. The connection interface 2357 may also be a communication module for communication in the above-described high speed line that connects the base station device 2350 (wireless communication interface 2355) to the RRH 2360.

The RRH 2360 includes a connection interface 2361 and a wireless communication interface 2363.

The connection interface 2361 is an interface for connecting the RRH 2360 (wireless communication interface 2363) to the base station device 2350. The connection interface 2361 may also be a communication module for communication in the above-described high speed line.

The wireless communication interface 2363 transmits and receives wireless signals via the antenna 2340. The wireless communication interface 2363 may typically include, for example, the RF circuit 2364. The RF circuit 2364 may include, for example, a mixer, a filter, and an amplifier, and transmits and receives wireless signals via the antenna 2340. As shown in FIG. 24, the wireless communication interface 2363 may include multiple RF circuits 2364. For example, the multiple RF circuits 2364 may support multiple antenna elements. Although FIG. 24 shows the example in which the wireless communication interface 2363 includes the multiple RF circuits 2364, the wireless communication interface 2363 may also include a single RF circuit 2364.

In the eNB 2200 shown in FIG. 23 and the eNB 2330 shown in FIG. 24, the communication unit in the apparatus at the base station side described in the above first and second embodiments may be implemented by the wireless communication interface 2225 and the wireless communication interface 2355 and/or the wireless communication interface 2363. At least a part of each of functional units in the apparatus at the base station side described in the above first and second embodiments may also be implemented by the controller 2221 and the controller 2351.

4-2. Application Example on User Equipment

FIG. 25 is a block diagram showing a schematic configuration example of a smart phone 2400 to which the technology of the present disclosure may be applied. The smart phone 2400 includes a processor 2401, a memory 2402, a storage 2403, an external connection interface 2404, a camera 2406, a sensor 2407, a microphone 2408, an input device 2409, a display device 2410, a speaker 2411, a wireless communication interface 2412, one or more antenna switches 2415, one or more antennas 2416, a bus 2417, a battery 2418, and an auxiliary controller 2419. It should be noted that the smart phone herein refers to a smart phone that is carried by, for example, an unmanned aerial vehicle to have a communication capability of the unmanned aerial vehicle.

The processor 2401 may be, for example, a CPU or a system on a chip (SoC), and controls functions of an application layer and another layer of the smart phone 2400. The memory 2402 includes a RAM and a ROM, and stores a program executed by the processor 2401 and data. The storage 2403 may include a storage medium such as a semiconductor memory and a hard disk. The external connection interface 2404 is an interface for connecting an external device (such as a memory card and a universal serial bus (USB) device) to the smart phone 2400.

The camera 2406 includes an image sensor (such as a charge coupled device (CCD) and a complementary metal oxide semiconductor (CMOS)), and generates a captured image. The sensor 2407 may include a group of sensors such as a measurement sensor, a gyro sensor, a geomagnetic sensor, and an acceleration sensor. The microphone 2408 converts sounds that are inputted to the smart phone 2400 to audio signals. The input device 2409 includes, for example, a touch sensor configured to detect touch onto a screen of the display device 2410, a keypad, a keyboard, a button, or a switch, and receives an operation or information inputted from a user. The display device 2410 includes a screen (such as a liquid crystal display (LCD) and an organic light-emitting diode (OLED) display), and displays an output image of the smart phone 2400. The speaker 2411 converts audio signals that are outputted from the smart phone 2400 to sounds.

The wireless communication interface 2412 supports any cellular communication scheme (such as LTE and LTE-Advanced), and performs a wireless communication. The wireless communication interface 2412 may typically include, for example, a BB processor 2413 and an RF circuit 2414. The BB processor 2413 may perform, for example, encoding/decoding, modulating/demodulating, and multiplexing/demultiplexing, and performs various types of signal processing for wireless communication. Meanwhile, the RF circuit 2414 may include, for example, a mixer, a filter, and an amplifier, and transmits and receives wireless signals via the antenna 2416. The wireless communication interface 2412 may be a chip module having the BB processor 2413 and the RF circuit 2414 integrated thereon. As shown in FIG. 25, the wireless communication interface 2412 may include multiple BB processors 2413 and multiple RF circuits 2414. Although FIG. 25 shows the example in which the wireless communication interface 2412 includes the multiple BB processors 2413 and the multiple RF circuits 2414, the wireless communication interface 2412 may also include a single BB processor 2413 or a single RF circuit 2414.

Furthermore, in addition to a cellular communication scheme, the wireless communication interface 2412 may support another type of wireless communication scheme such as a short-distance wireless communication scheme, a near field communication scheme, and a wireless local area network (LAN) scheme. In this case, the wireless communication interface 2412 may include the BB processor 2413 and the RF circuit 2414 for each wireless communication scheme.

Each of the antenna switches 2415 switches connection destinations of the antennas 2416 among multiple circuits (such as circuits for different wireless communication schemes) included in the wireless communication interface 2412.

Each of the antennas 2416 includes a single or multiple antenna elements (such as multiple antenna elements included in an MIMO antenna), and is used for the wireless communication interface 2412 to transmit and receive wireless signals. As shown in FIG. 25, the smart phone 2400 may include multiple antennas 2416. Although FIG. 25 shows the example in which the smart phone 2400 includes the multiple antennas 2416, the smart phone 2400 may also include a single antenna 2416.

Furthermore, the smart phone 2400 may include the antenna 2416 for each wireless communication scheme. In this case, the antenna switches 2415 may be omitted from the configuration of the smart phone 2400.

The bus 2417 connects the processor 2401, the memory 2402, the storage 2403, the external connection interface 2404, the camera 2406, the sensor 2407, the microphone 2408, the input device 2409, the display device 2410, the speaker 2411, the wireless communication interface 2412, and the auxiliary controller 2419 to each other. The battery 2418 supplies power to blocks of the smart phone 2400 shown in FIG. 25 via feeder lines that are partially shown as dashed lines in the FIG. 25. The auxiliary controller 2419 operates a minimum necessary function of the smart phone 2400, for example, in a sleep mode.

In the smart phone 2400 shown in FIG. 25, the communication unit in the device at the user equipment side described in the above first and second embodiments may be implemented by the wireless communication interface 2412. At least a part of each of functional units in the apparatus at the user equipment side described in the above first and second embodiments may also be implemented by the processor 2401 or the auxiliary controller 2419.

The preferred embodiments of the present disclosure have been described above with reference to the drawings, but the present disclosure is not limited to the above examples. Those skilled in the art can make various changes and modifications within the scope of the appended claims, and it should be understood that such changes and modifications fall within the technical scope of the present disclosure.

For example, units shown by dashed boxes in functional block diagrams shown in the drawings indicate that the functional units are optional in the respective devices, and the various optional functional units can be combined in an appropriate manner to achieve required features.

For example, multiple functions included in a unit in the above embodiments may be implemented by separate devices. Alternatively, multiple functions implemented by multiple units in the above embodiments may be implemented by separate devices, respectively. In addition, one of the above functions may be implemented by multiple units. Such a configuration is included in the technical scope of the present disclosure.

In this specification, the steps described in the flowcharts include not only processes performed in time series in the stated order, but also processes performed in parallel or individually rather than necessarily in time series. Further, even in the step of processing in time series, the order can be appropriately changed.

The present disclosure and advantages thereof are described in detail, and it should be understood that various changes, substitutions and alterations may be made without departing from the spirit and scope of the present disclosure as defined by the appended claims. Furthermore, the terms "comprising" "including", "containing" or any other variants thereof in the embodiments of the present disclosure are intended to encompass non-exclusive inclusion, such that a process, method, article, or device that includes a series of elements includes not only those elements but also includes other elements that are not explicitly listed, or includes elements that are inherent to such a process, method, article, or device. In the absence of more restrictions, the elements defined by the sentence "including a . . . " do not exclude the presence of additional same elements in the process, method, article, or device that includes the elements.

The invention claimed is:

1. A base station in a wireless communication system, the base station comprising processing circuitry configured to:
   configure a range of measured cells and a measurement triggering event for a user equipment (UE) that performs unmanned aerial vehicle (UAV) communication;
   send the measurement triggering event to the UE;
   receive a measurement report from the UE transmitted in response to the measurement triggering event, wherein the measurement triggering event is related to a number of cells in the range of measured cells;
   obtain, from the UE, flight trajectory information of the UE that includes locations of the UE;
   determine mobility control related information from the flight trajectory information of the UE, wherein the mobility control related information includes height state parameters;
   determine the range of measured cells to include adjacent cells of the current serving cells and additional cells than the adjacent cell based on a comparison of a current height of the UE to a predetermined height threshold in which it is determined that the current height of the UE is higher than the predetermined height threshold; and
   notify the range of the measured cells to the UE.

2. The base station according to claim 1, wherein the processing circuitry is further configured to perform different handover procedures based on the flight trajectory information.

3. The base station according to claim 1, wherein the processing circuitry is further configured to update the range of measured cells upon establishment of an RRC connection or in response to a request issued by the UE when a flight state of the UE changes.

4. A communication method for a base station in a wireless communication system, the method comprising:
   configuring a range of measured cells and a measurement triggering event for a user equipment (UE) that performs unmanned aerial vehicle (UAV) communication;
   sending the measurement triggering event to the UE;
   receiving a measurement report from the UE transmitted in response to the measurement triggering event, wherein the measurement triggering event is related to a number of cells in the range of measured cells; and
   obtaining, from the UE, flight trajectory information of the UE that includes locations of the UE;
   determining mobility control related information from the flight trajectory information of the UE, wherein the mobility control related information includes height state parameters;
   determining the range of measured cells to include adjacent cells of the current serving cells and additional cells than the adjacent cell based on a comparison of a current height of the UE to a predetermined height threshold in which it is determined that the current height of the UE is higher than the predetermined height threshold; and
   notify the range of the measured cells to the UE.

5. The communication method of claim 4, wherein the processing circuitry is further configured to perform different handover procedures based on the flight trajectory information.

6. The communication method of claim 4, wherein the processing circuitry is further configured to update the range of measured cells upon establishment of an RRC connection or in response to a request issued by the UE when a flight state of the UE changes.

* * * * *